(12) United States Patent
Yoshioka et al.

(10) Patent No.: US 7,864,461 B2
(45) Date of Patent: Jan. 4, 2011

(54) CAMERA MODULE

(75) Inventors: Satoru Yoshioka, Chiba (JP); Takahiro Okabe, Tokyo (JP); Masashi Nishimoto, Tokyo (JP); Yasutaka Takahashi, Chiba (JP); Mitsuru Ichikawa, Saitama (JP); Satoshi Imai, Kanagawa (JP)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 12/397,406

(22) Filed: Mar. 4, 2009

(65) Prior Publication Data

US 2009/0225454 A1 Sep. 10, 2009

(30) Foreign Application Priority Data

Mar. 5, 2008 (JP) .......................... P2008-054513

(51) Int. Cl.
*G02B 7/02* (2006.01)
(52) U.S. Cl. ..................... 359/824; 359/814; 359/813; 396/55; 396/529; 348/208.11; 348/345; 310/12.16
(58) Field of Classification Search ................. 359/813, 359/814, 819, 823, 824, 694–704; 396/55, 396/133, 529; 348/208.11, 208.99, 345; 310/12.02, 12.12, 12.19; 324/207.1, 207.21, 324/207.24
See application file for complete search history.

(56) References Cited

U.S. PATENT DOCUMENTS 4,507,765 A * 3/1985 Suzuki et al. ............ 369/44.22

| 4,676,605 | A  | * | 6/1987  | Toda et al. ................... 359/696 |
| 7,365,922 | B2 | * | 4/2008  | Lee et al. ..................... 359/813 |
| 7,405,892 | B2 | * | 7/2008  | Wu et al. ...................... 359/824 |
| 7,440,201 | B2 | * | 10/2008 | Tsuruta et al. ............... 359/824 |
| 7,623,159 | B2 | * | 11/2009 | Wada et al. ............... 348/222.1 |
| 7,652,835 | B2 | * | 1/2010  | Wang et al. .................. 359/824 |
| 7,664,380 | B2 | * | 2/2010  | Huang .......................... 396/55 |
| 7,679,849 | B2 | * | 3/2010  | Lule ........................... 359/824 |

FOREIGN PATENT DOCUMENTS

JP       2007 108597         4/2007

* cited by examiner

*Primary Examiner*—Loha Ben
(74) *Attorney, Agent, or Firm*—Frommer Lawrence & Haug LLP; William S. Frommer

(57) ABSTRACT

A camera module includes a rear lens barrel, a front lens barrel assembled to the rear lens barrel, the front lens barrel and the rear lens barrel together forming a housing space, a lens holder that holds an imaging optical system and is housed in the housing space, a guiding mechanism that movably supports the lens holder along the optical axis of the imaging optical system, and a driving unit that moves the lens holder along the optical axis of the imaging optical system, the driving unit including a magnet provided in the lens holder and a coil that faces the magnet. The rear lens barrel has a bottom wall that faces the housing space. The coil includes first and second coils disposed in the rear lens barrel on opposite sides of the optical axis in the housing space.

8 Claims, 35 Drawing Sheets

CAMERA MODULE

CROSS REFERENCES TO RELATED APPLICATIONS

The present invention contains subject matter related to Japanese Patent Application JP 2008-054513 filed in the Japanese Patent Office on Mar. 5, 2008, the entire contents of which being incorporated herein by reference.

BACKGROUND OF THE INVENTION

1. Field of the Invention

The present invention relates to a camera module built, for example, in a portable electronic apparatus.

2. Description of the Related Art

In recent years, mobile phones, PDAs (Personal Digital Assistants), and other electronic apparatus with a built-in camera module have been available.

Such a camera module includes a lens holder that holds an imaging optical system, a lens barrel that houses the lens holder, a spring that supports the lens holder in the lens barrel in such a way that the lens holder can move along the optical axis of the imaging optical system, an imaging device that captures a subject image introduced by the imaging optical system, and a driving unit that moves the lens holder along the optical axis (see JP-A-2007-108597).

SUMMARY OF THE INVENTION

As electronic apparatus with a built-in camera module are made smaller, thinner, and lighter in recent years, how to reduce the camera module in size has been a great challenge.

Thus, it is desirable to provide a camera module having an advantage in size reduction, and the invention has been made in view of such circumstances.

According to an embodiment of the invention, there is provided a camera module including a rear lens barrel, a front lens barrel assembled to the rear lens barrel, the front lens barrel and the rear lens barrel together forming a housing space, a lens holder that holds an imaging optical system and is housed in the housing space, a guiding mechanism that movably supports the lens holder along the optical axis of the imaging optical system, and a driving unit that moves the lens holder along the optical axis of the imaging optical system, the driving unit including a magnet provided in the lens holder and a coil that faces the magnet. The rear lens barrel has a bottom wall that faces the housing space. The coil includes first and second coils disposed in the rear lens barrel on opposite sides of the optical axis in the housing space. A winding wire that forms the first coil is electrically connected in series to a winding wire that forms the second coil via a relay line. The relay line has a portion extending between the first coil and the second coil along a surface of the bottom wall that is located on the side opposite the housing space.

According to the embodiment of the invention, since a surface that is a dead space on the bottom wall and located on the side opposite the housing space is used to dispose the relay line between the first coil and the second coil, it is not necessary to reserve a space for disposing the relay line. This is advantageous in reducing the size of the bottom wall and hence the size of the camera module.

DESCRIPTION OF THE PREFERRED EMBODIMENTS

An embodiment of the invention will be described below with reference to the drawings.

Figure 1A:
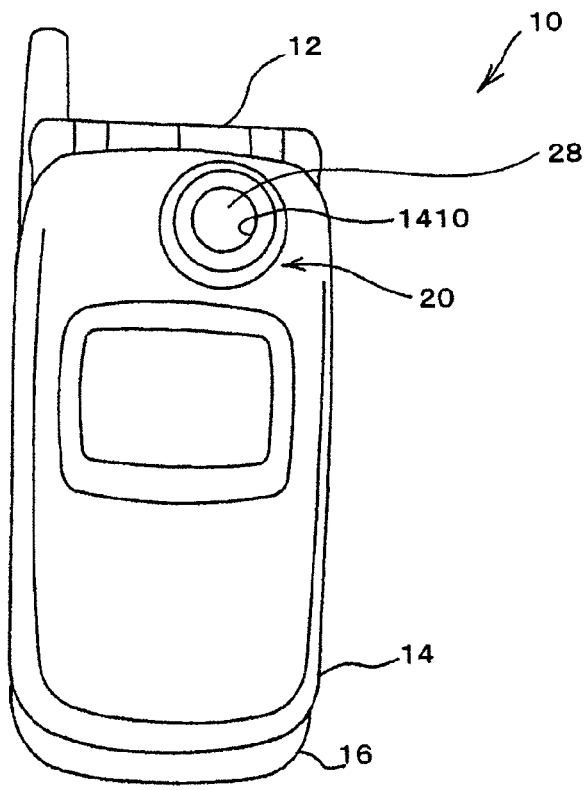
FIGS. 1A and 1B are exterior views showing an example of an electronic apparatus with a built-in camera module 20 according to an embodiment.
Figure 1B:
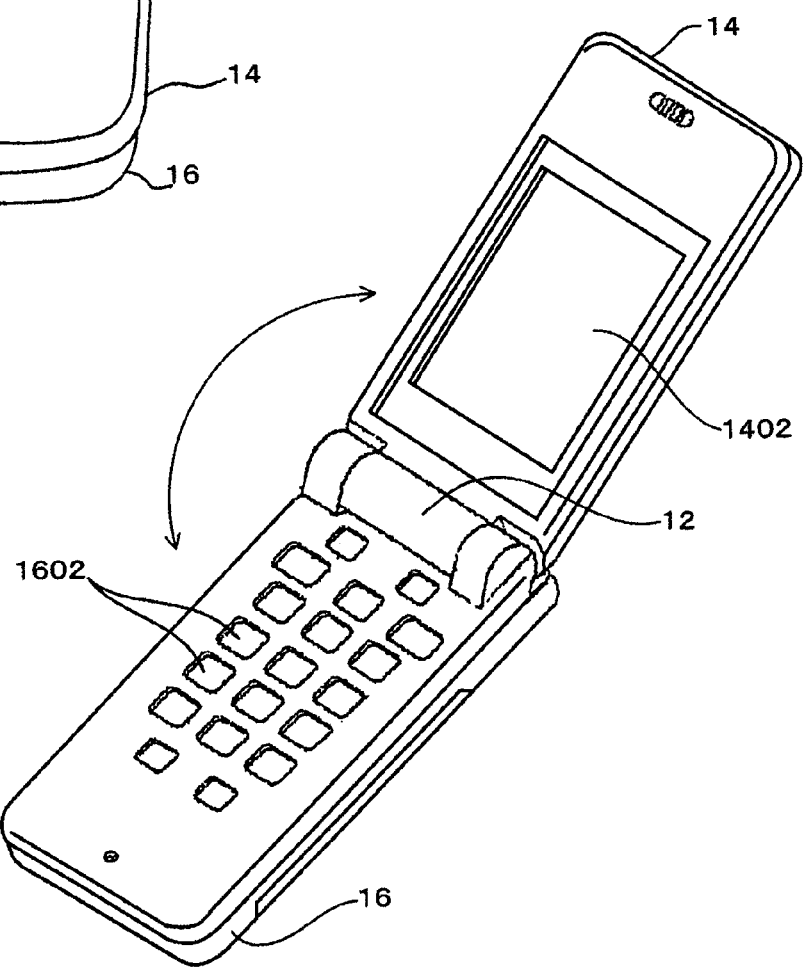

FIGS. 1A and 1B are exterior views showing an example of an electronic apparatus with a built-in camera module 20 according to the present embodiment.

As shown in FIGS. 1A and 1B, the electronic apparatus 10 is a mobile phone and includes first and second enclosures 14, 16 swingably connected to each other by means of a hinge 12.

A liquid crystal display panel 1402 is provided on the inner side of the first enclosure 14, and operation switches 1602, such as numeric keypads and function keys, are provided on the inner side of the second enclosure 16.

The camera module 20 includes an imaging optical system 28 that captures a subject image.

The camera module 20 is built in the first enclosure 14 with the imaging optical system 28 facing an opening 1410 provided in the first enclosure 14, and an image captured by the camera module 20 is displayed on the liquid crystal display panel 1402.

The configuration of the camera module 20 according to the embodiment of the invention will be described in detail.

Figure 2A:
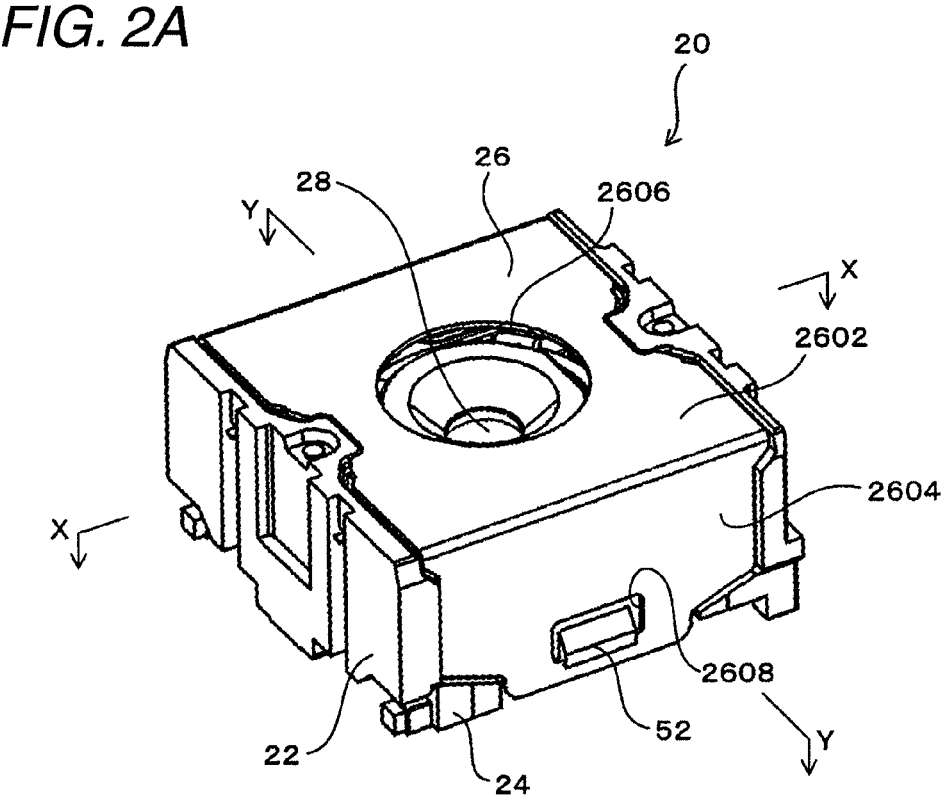
FIGS. 2A and 2B are perspective views of the camera module 20.
Figure 2B:
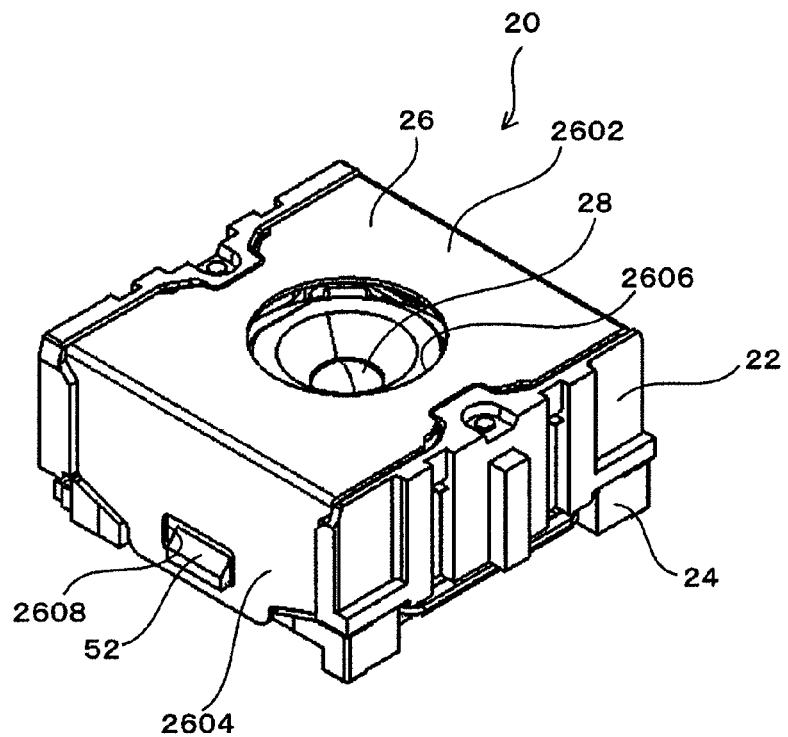
Figure 3:
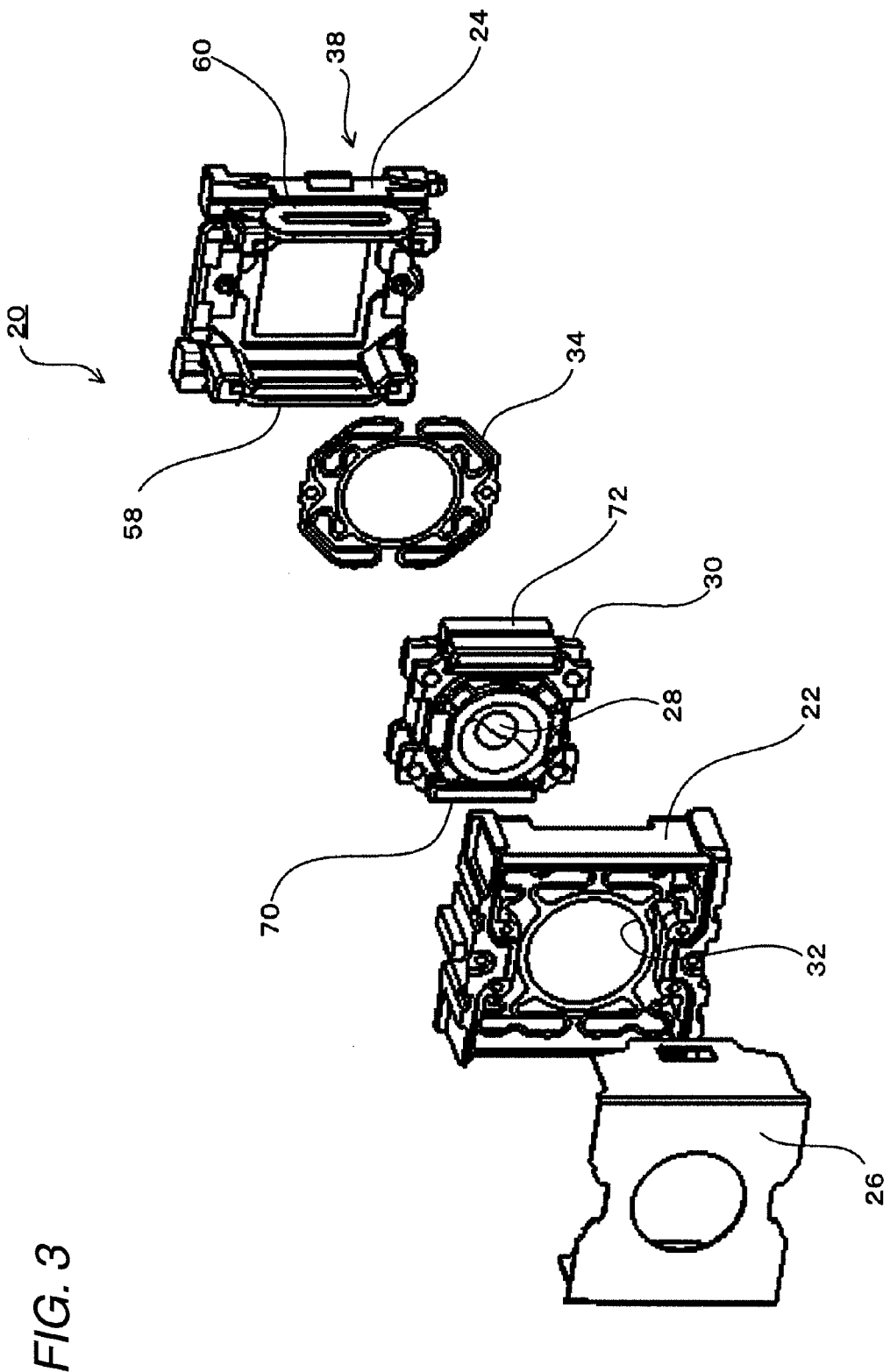
FIG. 3 is a perspective exploded diagram of the camera module 20.
Figure 4:
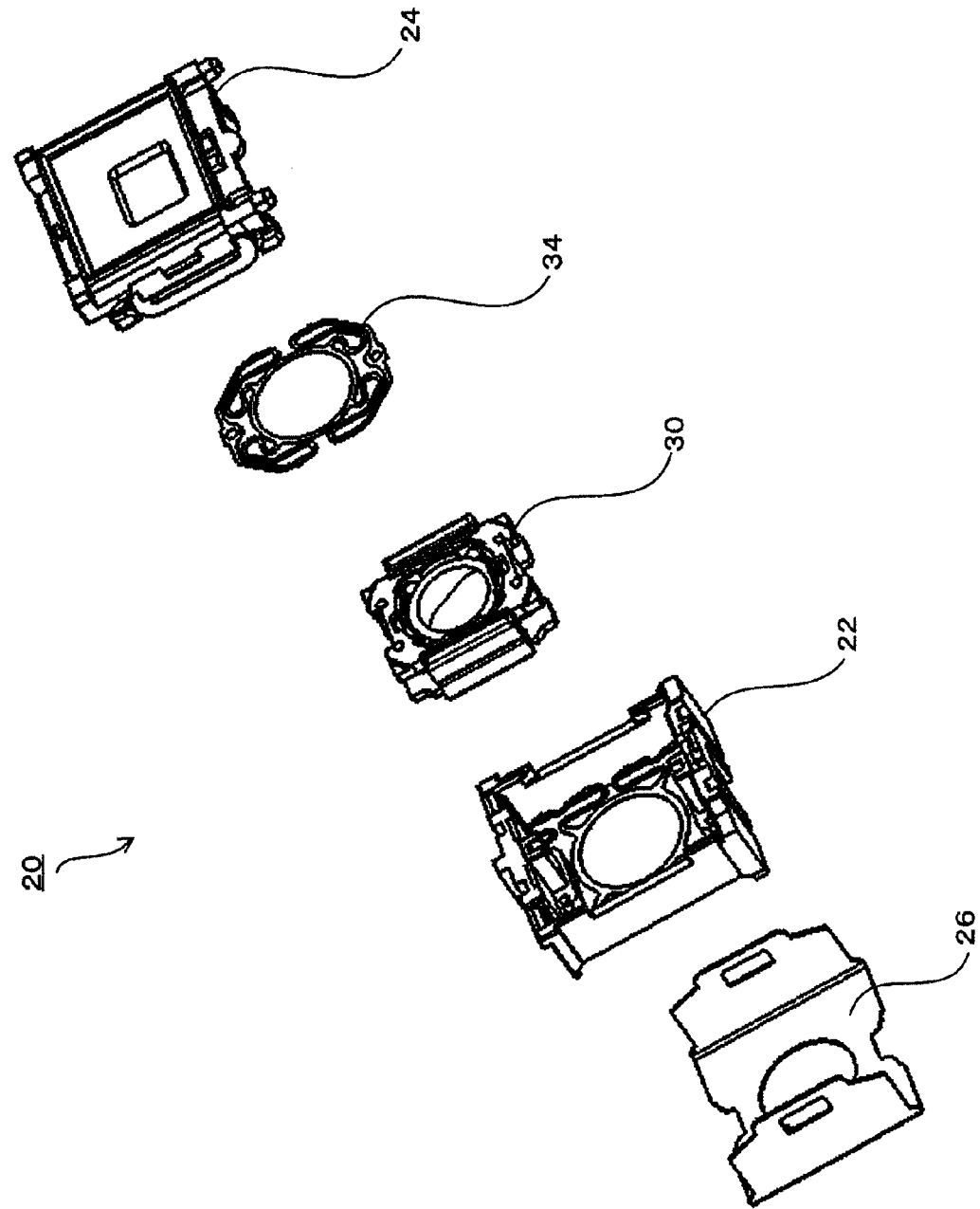
FIG. 4 is a perspective exploded diagram of the camera module 20.

FIGS. 2A and 2B are perspective views of the camera module 20, and FIGS. 3 and 4 are perspective exploded diagrams of the camera module 20.

Figure 5:
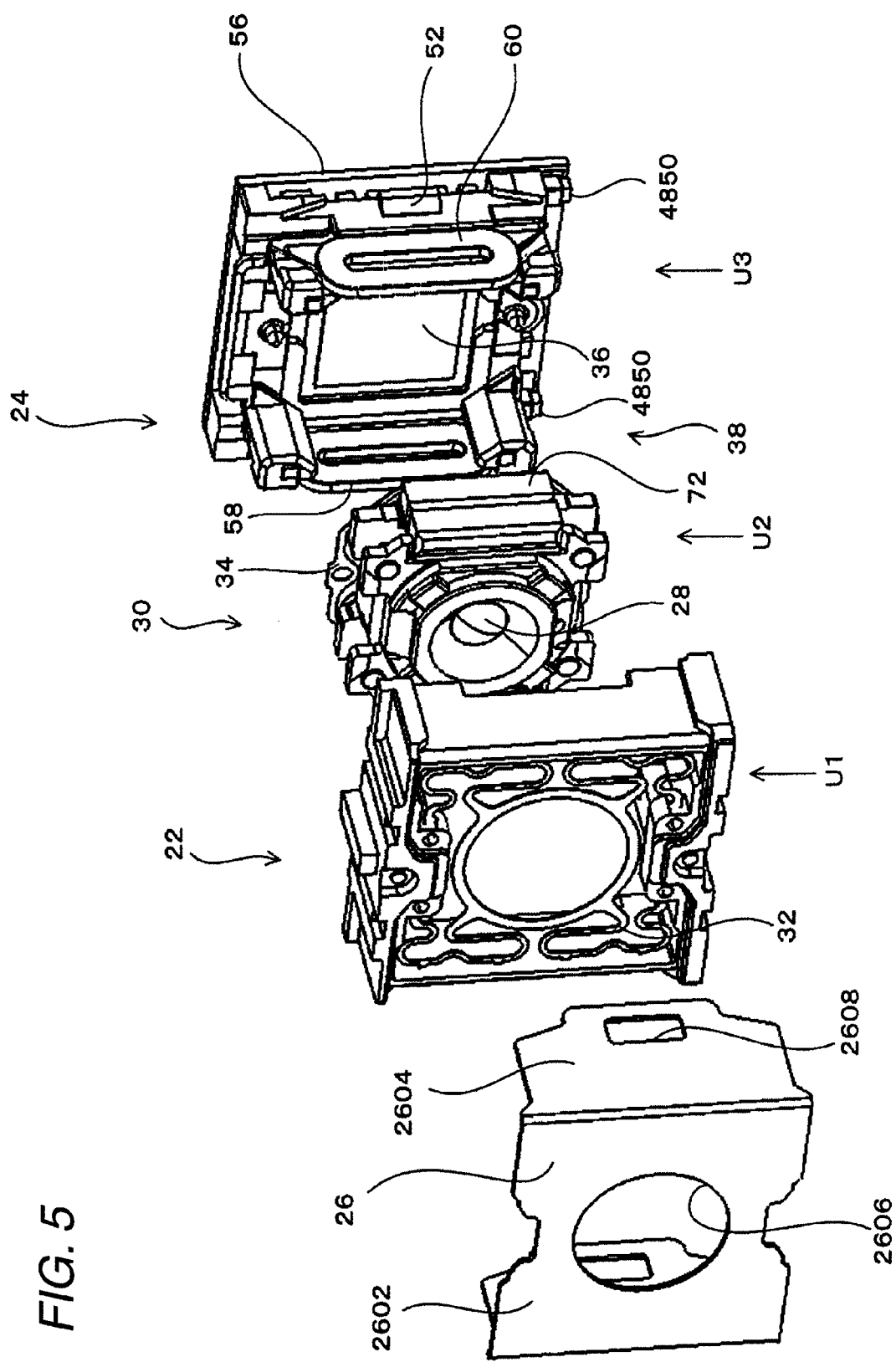
FIG. 5 explains how to assemble a front lens barrel 22, a lens holder 30, and a rear lens barrel 24.

FIG. 5 explains how to assemble a front lens barrel 22, a lens holder 30, and a rear lens barrel 24.

Figure 34:
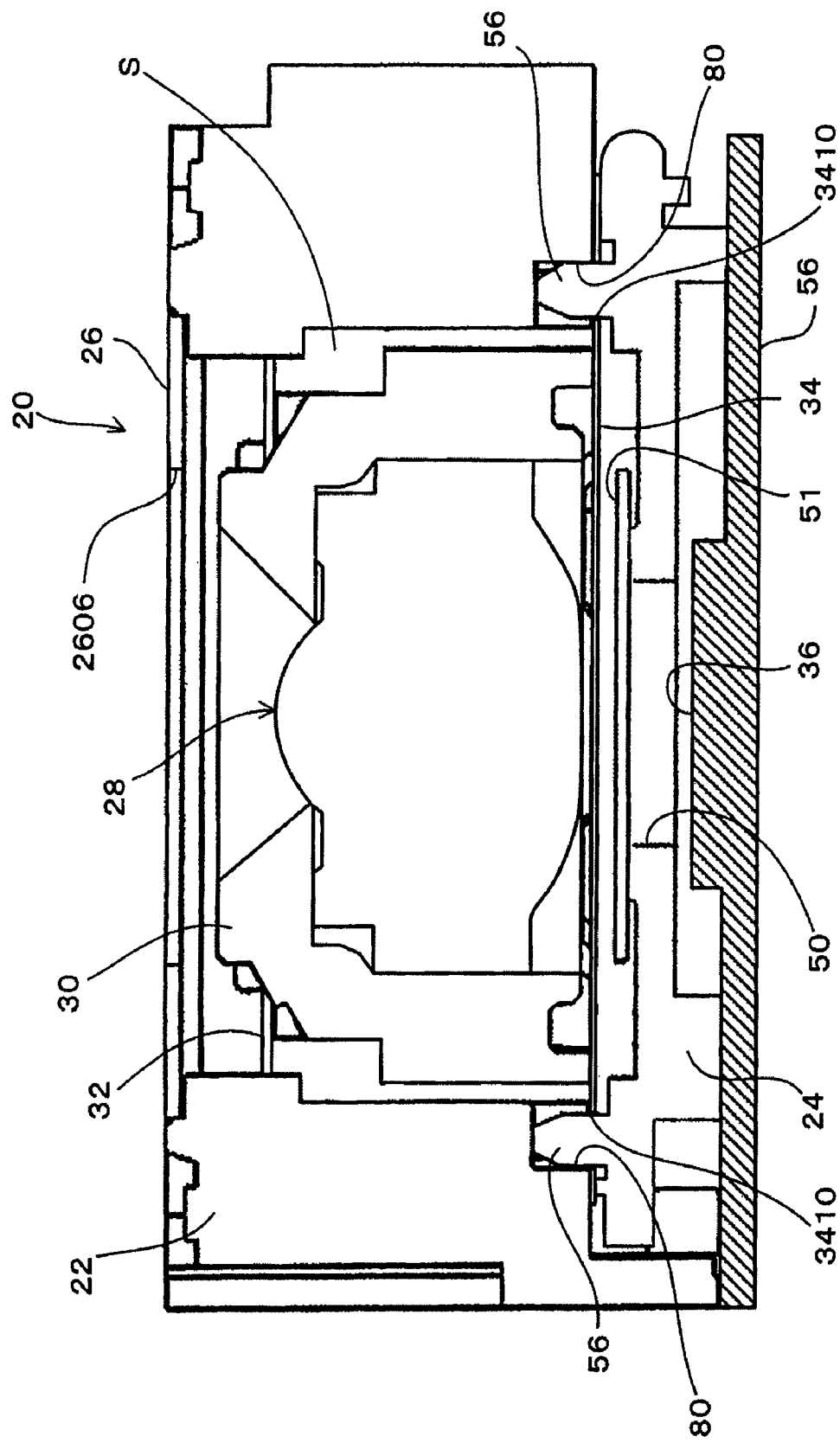
FIG. 34 is a cross-sectional view taken along the line XX shown in FIG. 2A.
Figure 35:
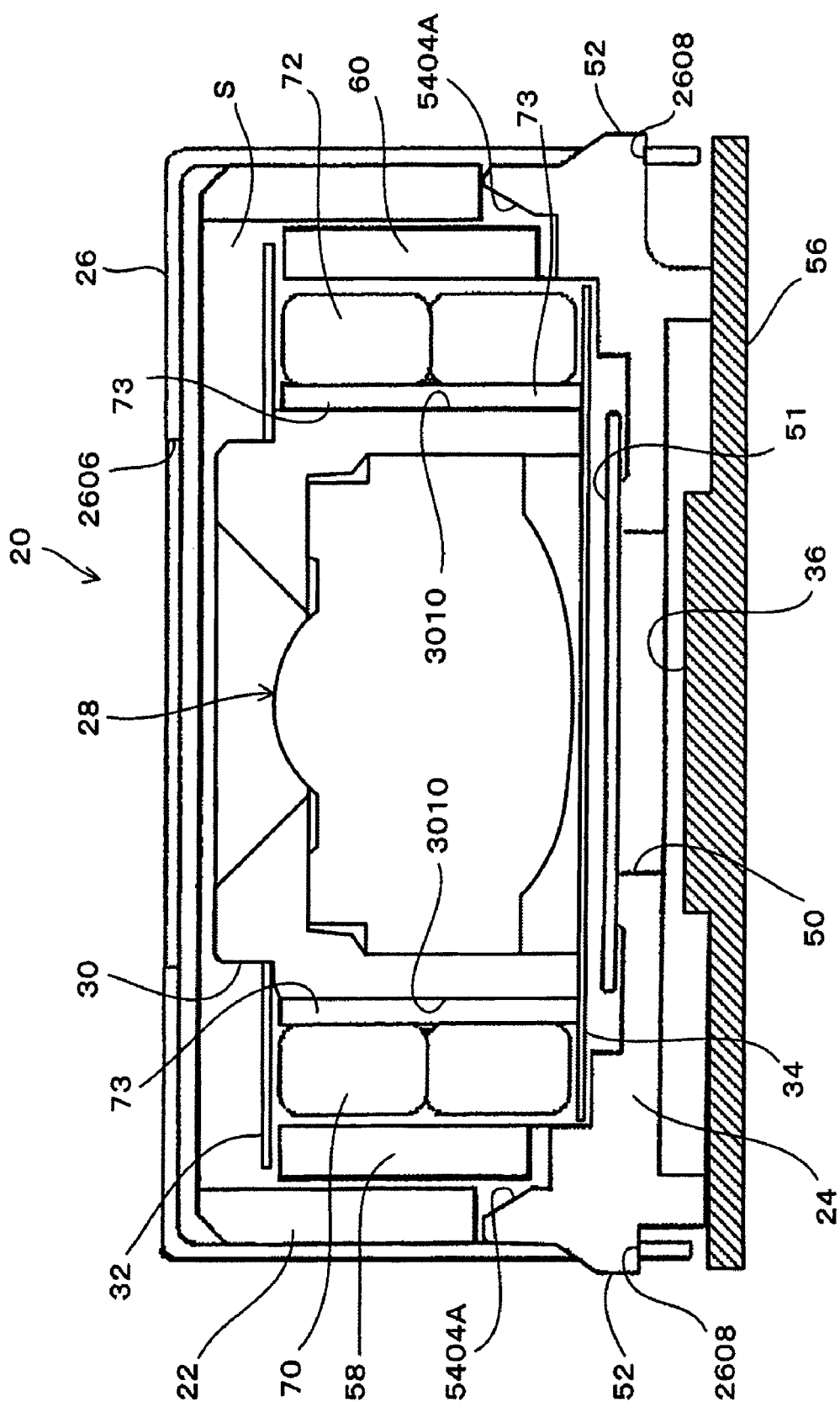
FIG. 35 is a cross-sectional view taken along the line YY shown in FIG. 2A.

FIG. 34 is a cross-sectional view taken along the line XX shown in FIG. 2A, and FIG. 35 is a cross-sectional view taken along the line YY shown in FIG. 2A.

In the present embodiment, the description will be made assuming that the side on which a subject is located is "front" and the opposite side is "rear."

As shown in FIGS. 3 and 4, the camera module 20 includes not only the imaging optical system 28 described above but also a front lens barrel 22, a rear lens barrel 24, a cover 26, a lens holder 30, a front spring 32, a rear spring 34, an imaging device 36, and a driving unit 38 (FIGS. 34 and 35).

(Front Lens Barrel 22)

Figure 6:
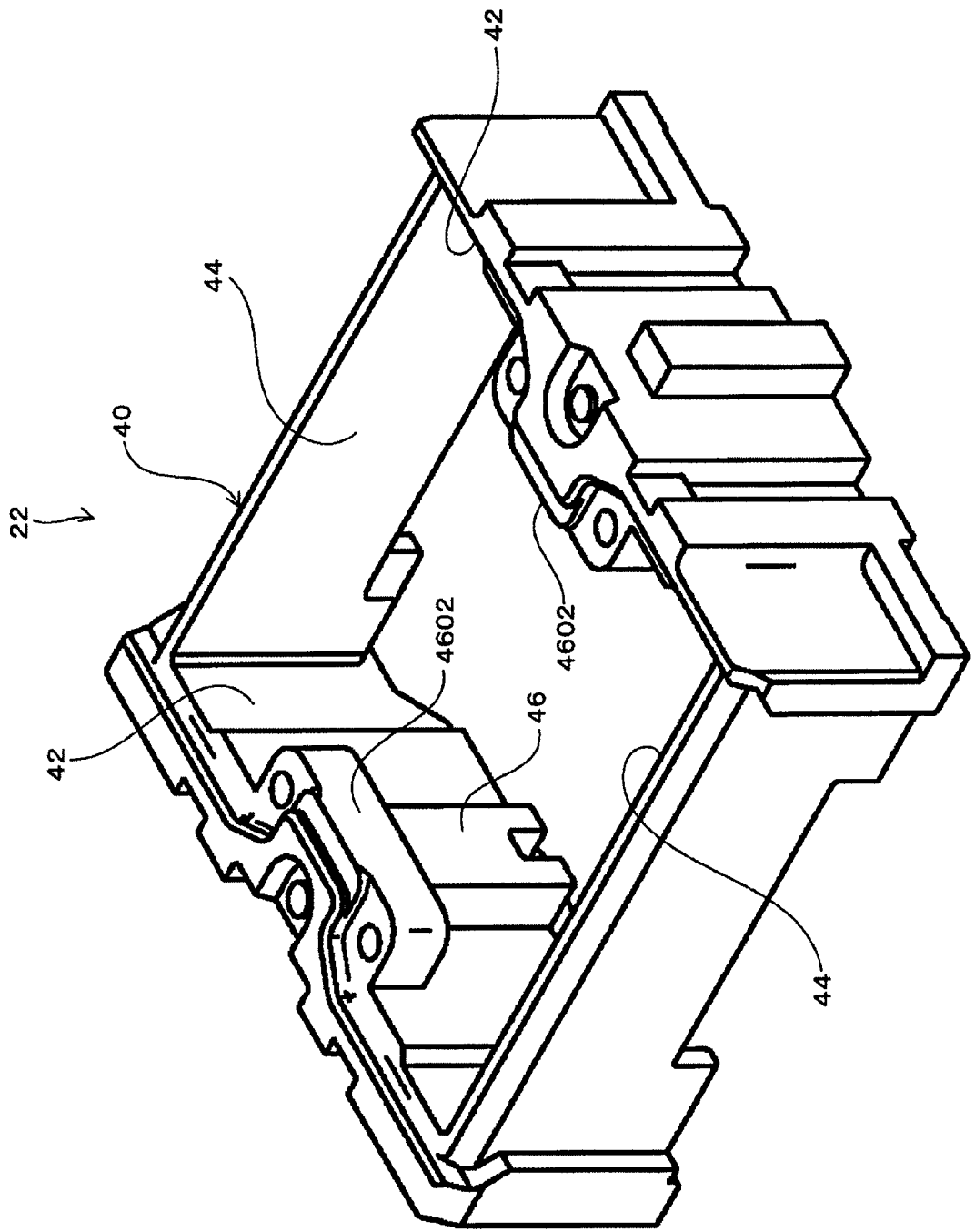
FIG. 6 is a front perspective view of the front lens barrel 22.
Figure 7:
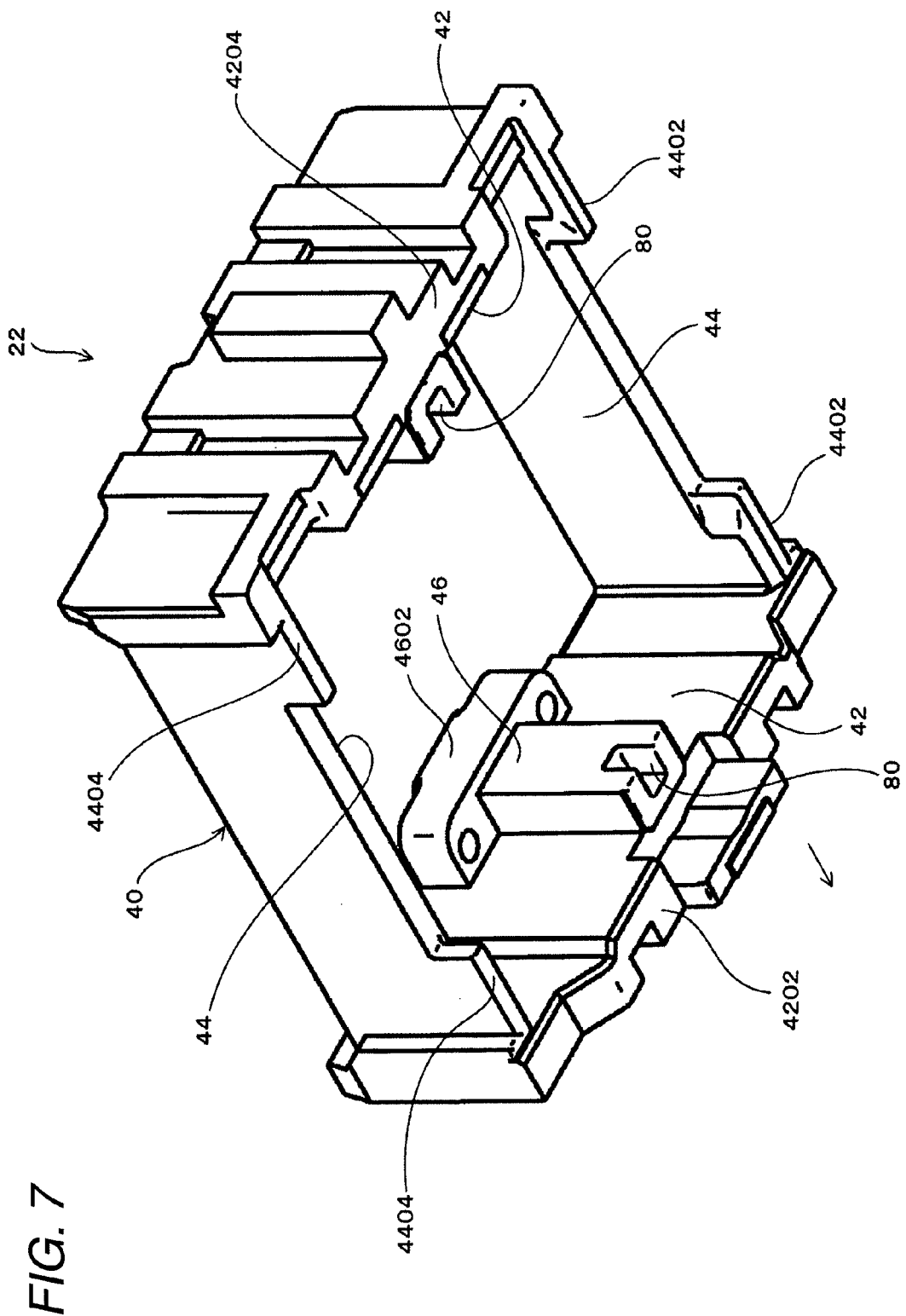
FIG. 7 is a rear perspective view of the front lens barrel 22.
Figure 8:
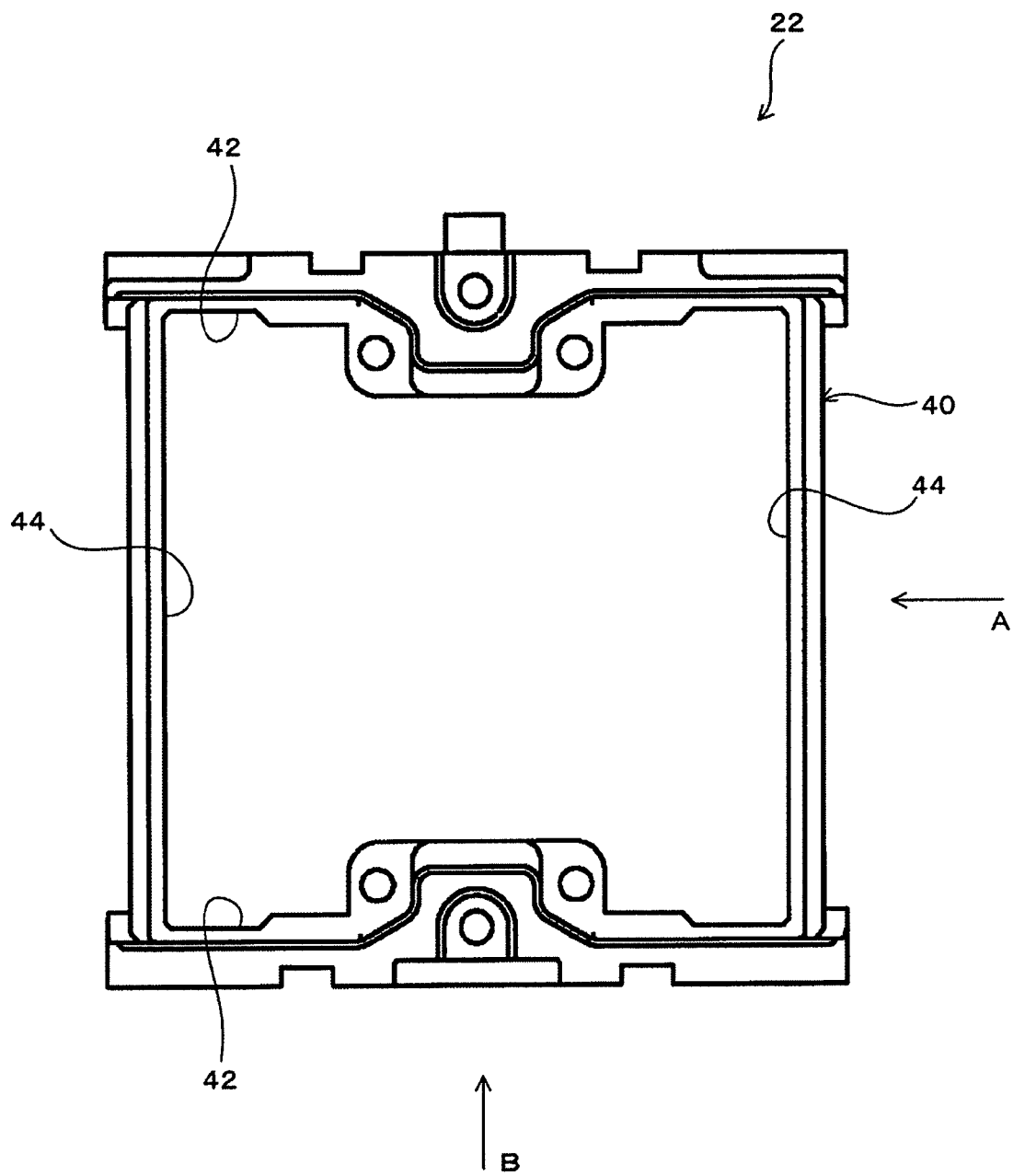
FIG. 8 is a plan view of the front lens barrel 22.
Figure 9:
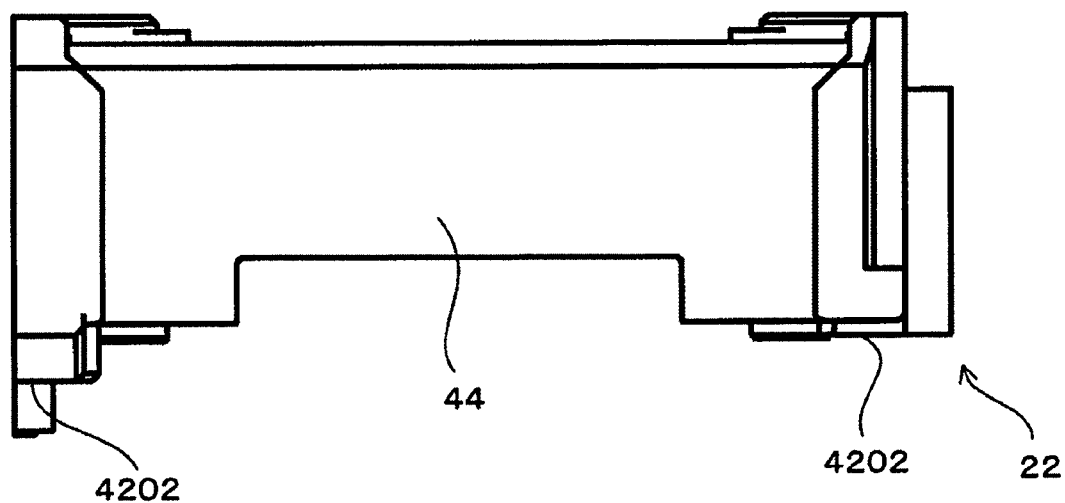
FIG. 9 shows the front lens barrel 22 viewed in the direction indicated by the arrow A shown in FIG. 8.
Figure 10:
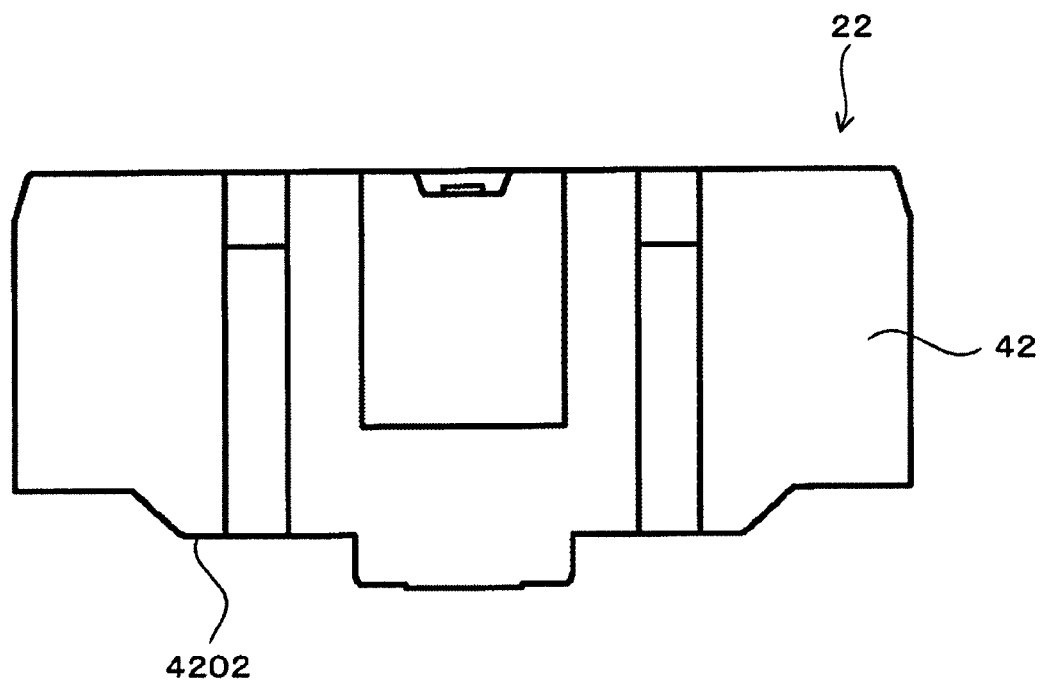
FIG. 10 shows the front lens barrel 22 viewed in the direction indicated by the arrow B shown in FIG. 8.
Figure 11:
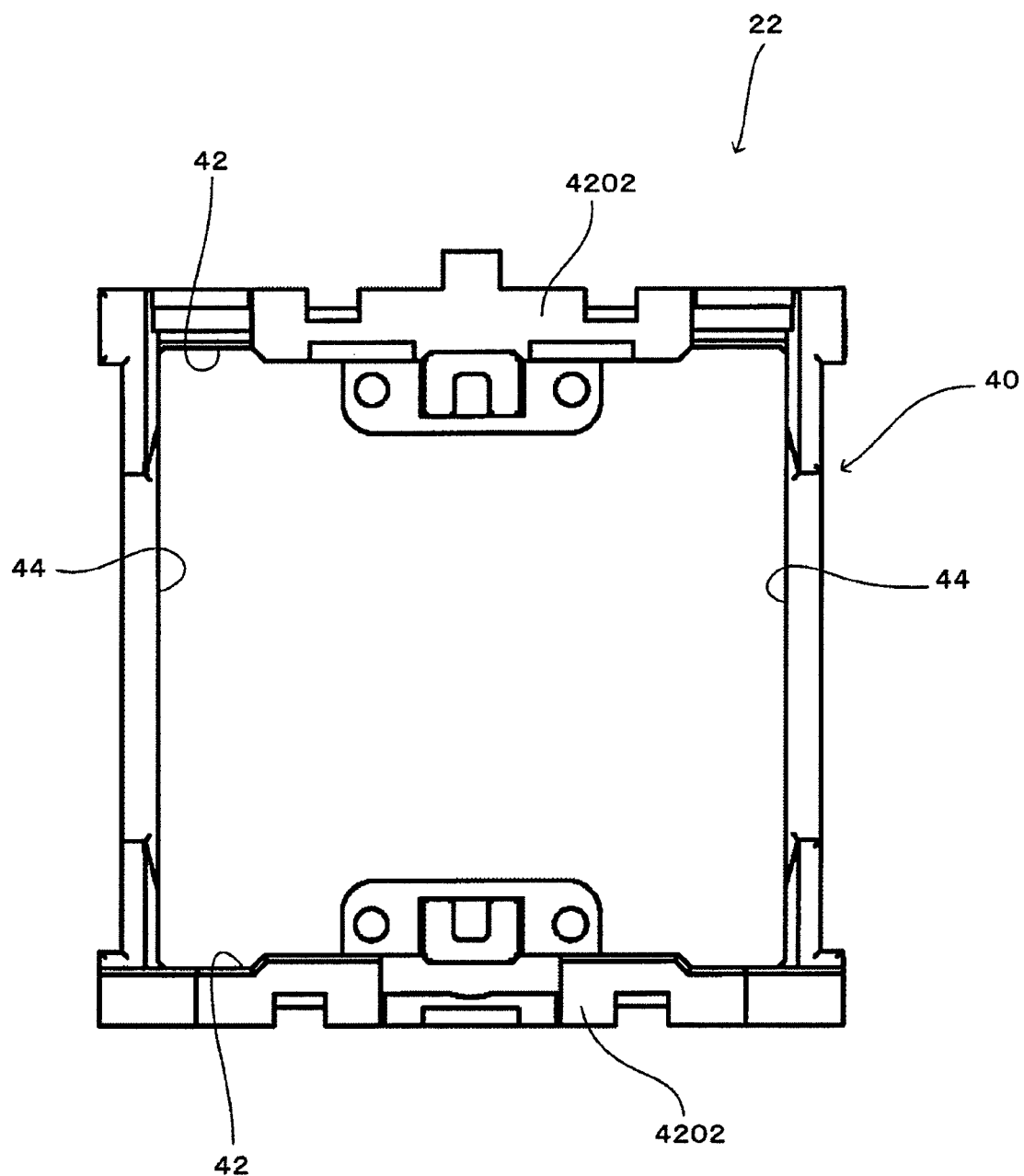
FIG. 11 is a rear view of the front lens barrel 22.
Figure 12:
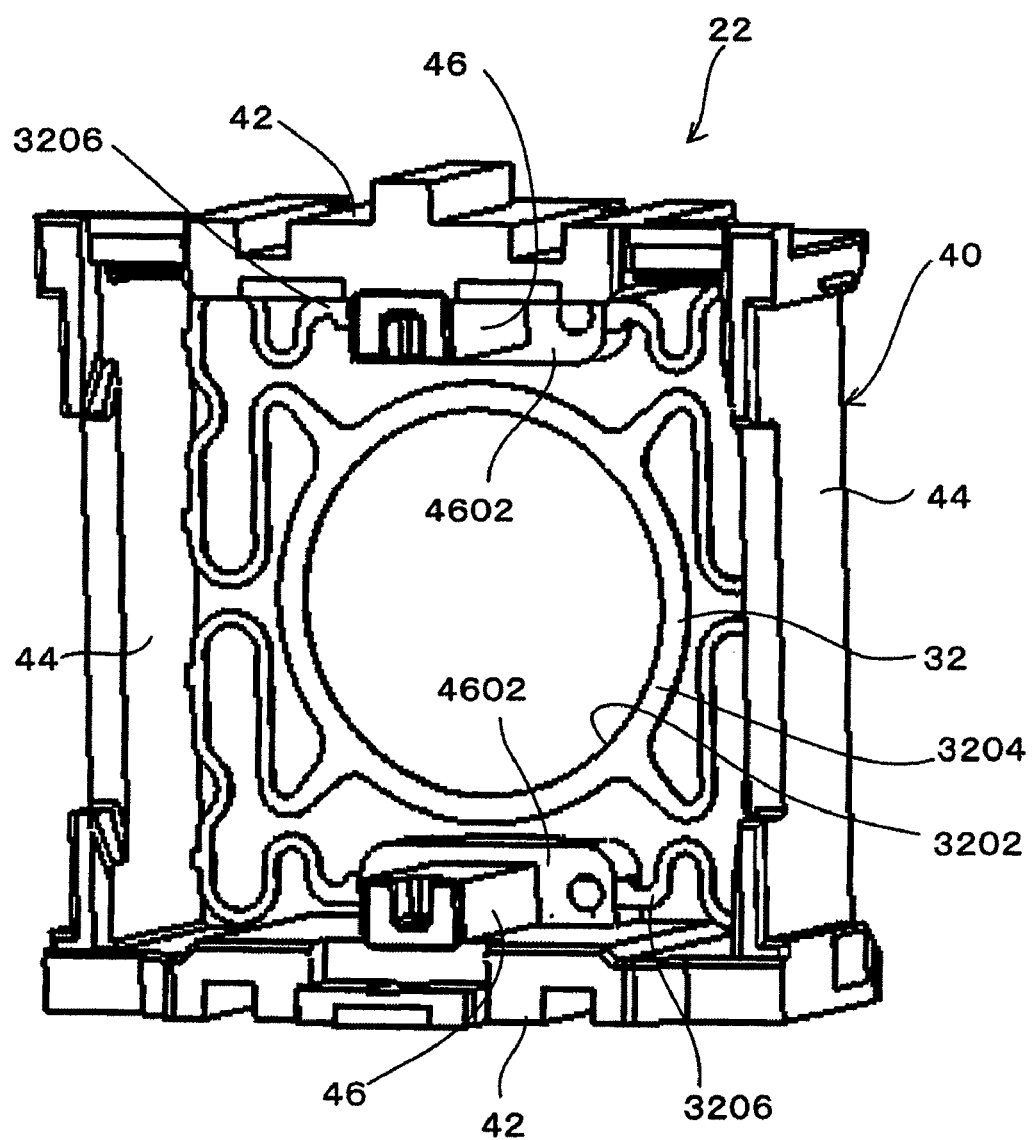
FIG. 12 is a rear view of the front lens barrel 22 into which a front spring 32 is incorporated.

FIG. 6 is a front perspective view of the front lens barrel 22. FIG. 7 is a rear perspective view of the front lens barrel 22. FIG. 8 is a plan view of the front lens barrel 22. FIG. 9 shows the front lens barrel 22 viewed in the direction indicated by the arrow A shown in FIG. 8. FIG. 10 shows the front lens barrel 22 viewed in the direction indicated by the arrow B shown in FIG. 8. FIG. 11 is a rear view of the front lens barrel 22. FIG. 12 is a rear view of the front lens barrel 22 into which the front spring 32 is incorporated.

The front barrel 22 is assembled to the rear lens barrel 24, and the front lens barrel 22 and the rear lens barrel 24 together form a housing space S.

As shown in FIGS. 6 to 11, the front lens barrel 22 has a tubular shape and includes a peripheral wall 40. The inner surface of the peripheral wall 40 defines the side plane of the housing space S (FIGS. 34 and 35) located around the optical axis of the imaging optical system 28 (FIG. 5).

The peripheral wall 40 includes a pair of first side walls 42 facing each other and another pair of second side walls 44 facing each other, and hence has a rectangular frame shape.

Each of the side walls 42 and 44 has a height along the optical axis and a width perpendicular to the height. In the present embodiment, a raised wall 46 is formed on the inner surface of each of the two first side walls 42, the raised wall 46 located at the center of the inner surface in the width direction and extending along the height direction.

The front lens barrel 22 is formed by molding a synthetic resin in a die.

As shown in FIG. 7, the rear-end surfaces of the two first side walls 42 that face backward form first and second mating surfaces 4202, 4204.

Similarly, the rear-end surfaces of the two second side walls 44 that face backward form third and fourth mating surfaces 4402, 4404.

(First and Second Coils 58, 60)

The driving unit 38 includes first and second coils 58, 60.

The first and second coils 58, 60 have substantially the same flat-plate shape having a thin thickness in the direction of a central axis around which a winding wire that forms each of the coils is wound, a height perpendicular to the width and extending along the optical axis, and a width perpendicular to the height.

Figure 19:
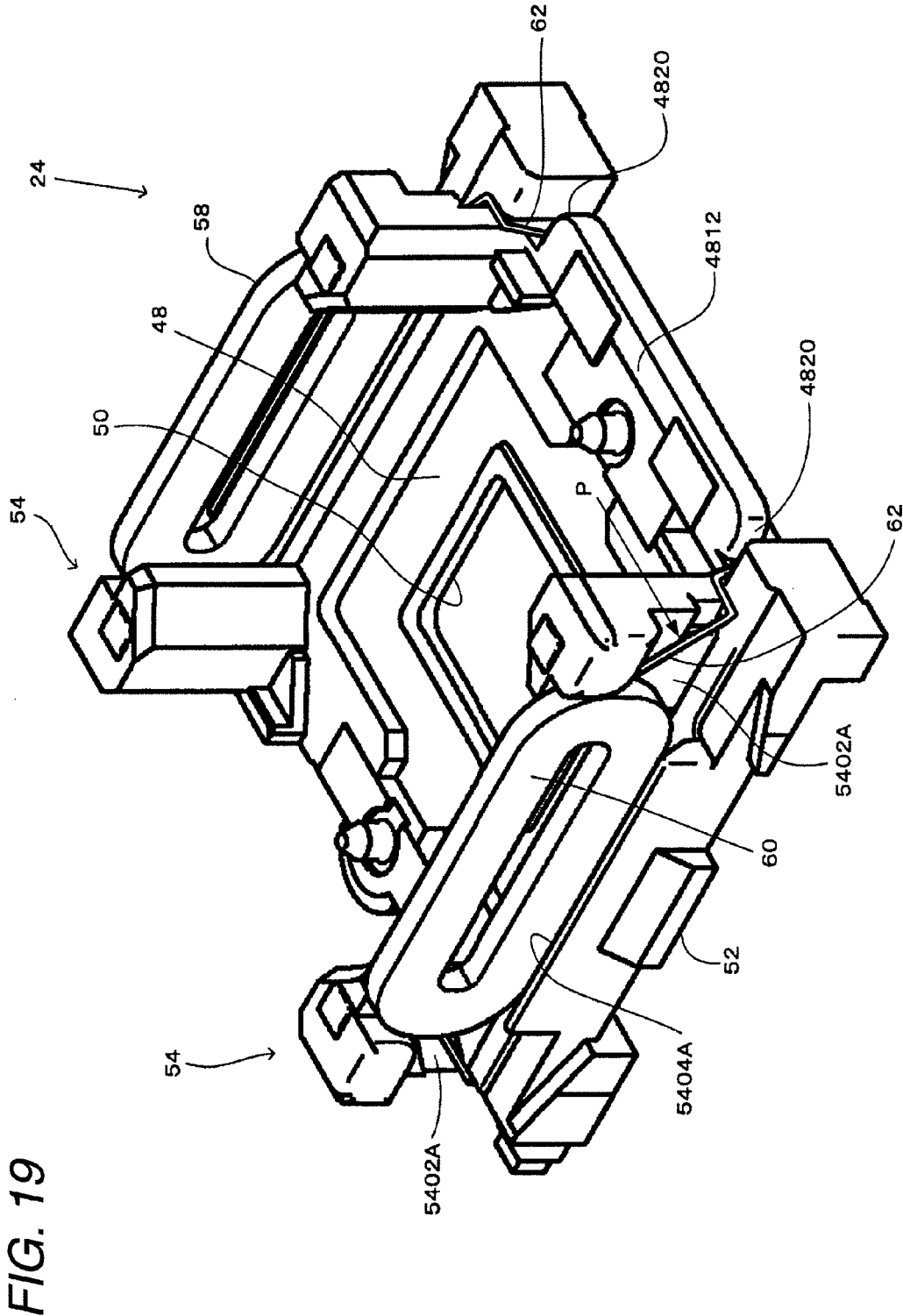
FIG. 19 is a front perspective view of the rear lens barrel to which coils are attached.
Figure 20:
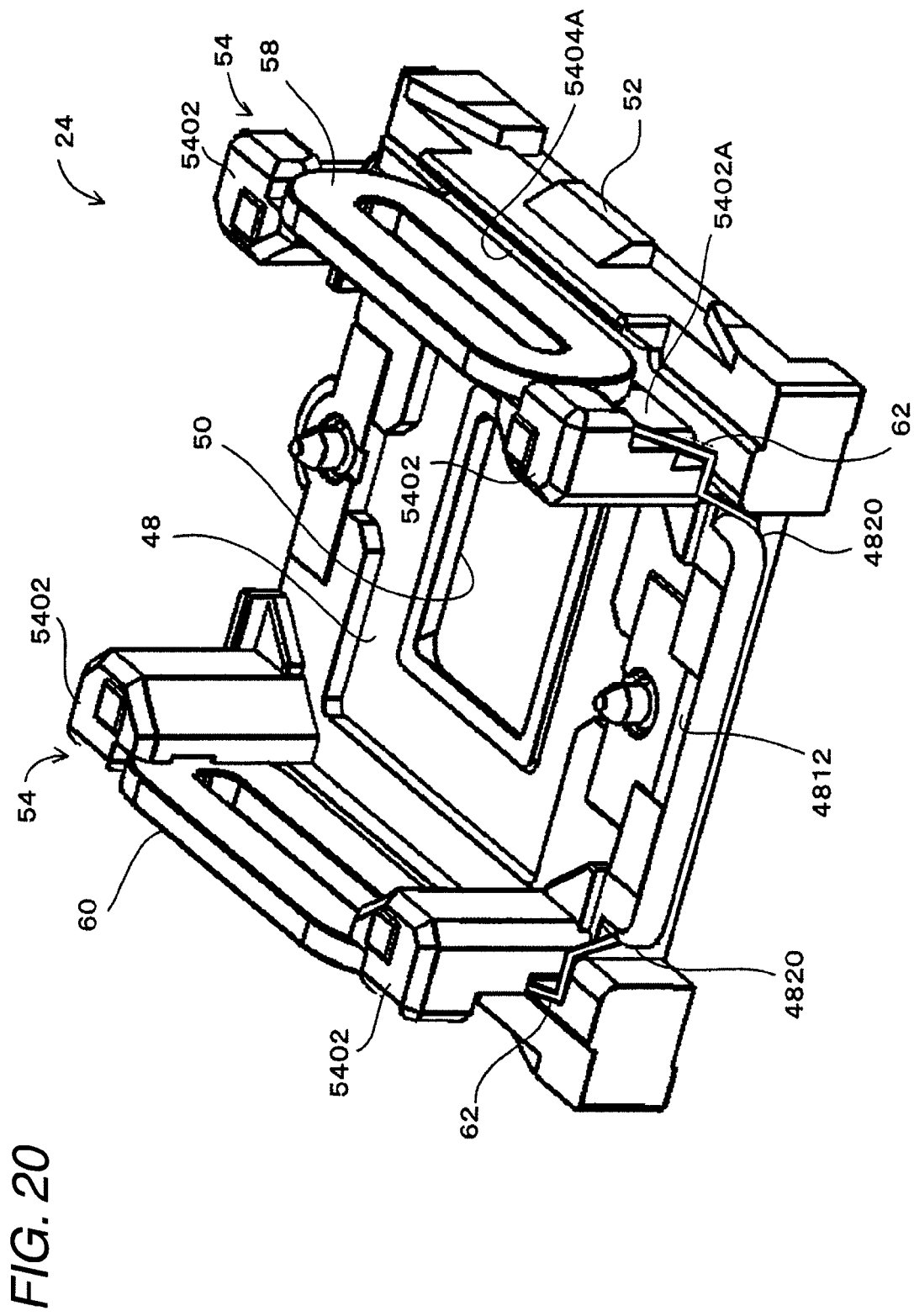
FIG. 20 is a front perspective view of the rear lens barrel to which coils are attached.

In the present embodiment, each of the first and second coils 58, 60 has an elliptical shape having two parallel linear portions and two curved portions that connect both ends of the linear portions, as shown in FIGS. 19 and 20. An elongated central opening is formed in a central portion of each of the first and second coils 58, 60.

The winding wire that forms the first coil 58 and the winding wire that forms the second coil 60 are electrically connected via a relay line 62 to form serial connection.

In the present embodiment, a single winding wire forms the first and second coils 58, 60 and the relay line 62.

(Rear Lens Barrel 24)

Figure 13:
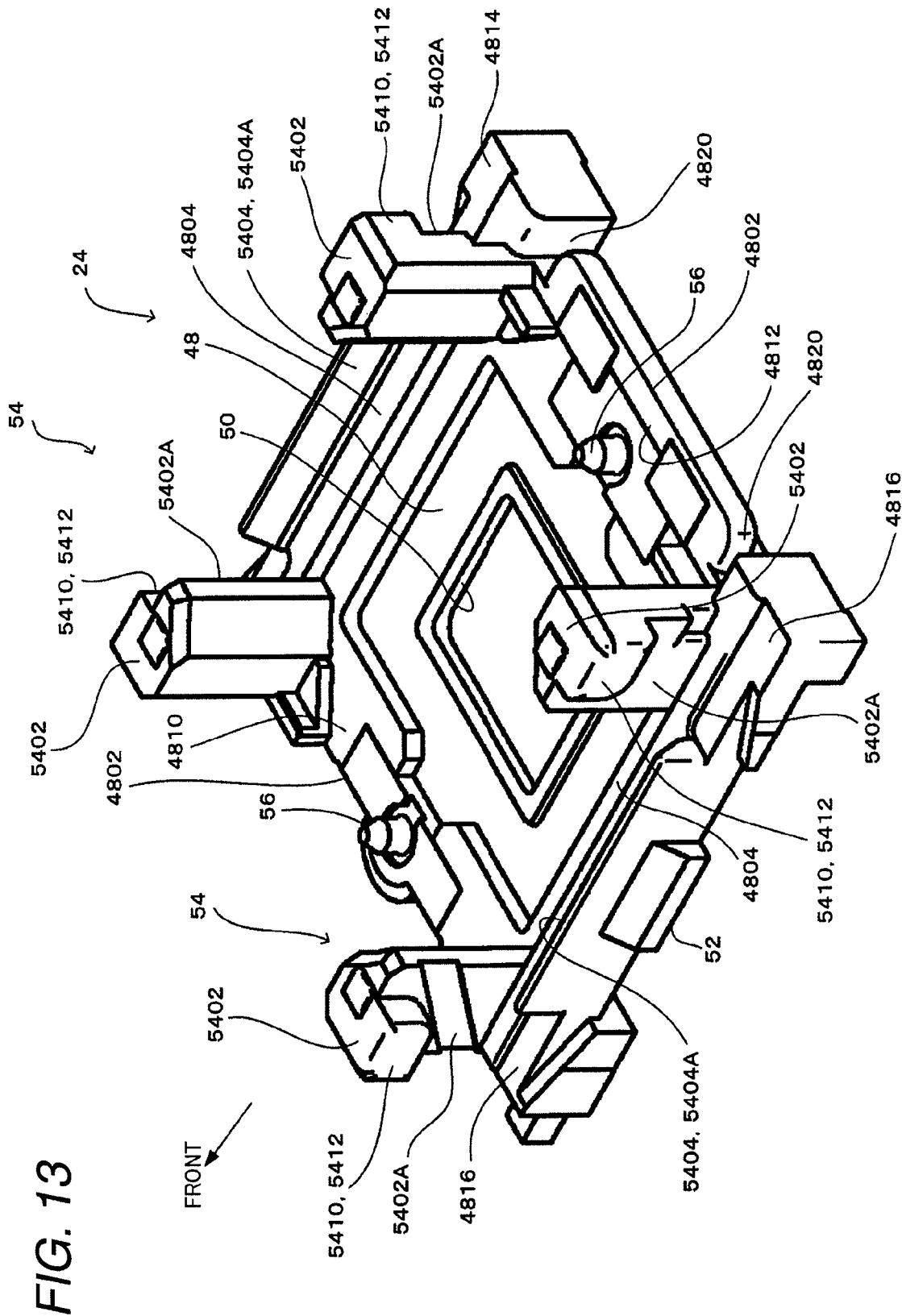
FIG. 13 is a front perspective view of the rear lens barrel 24.
Figure 14:
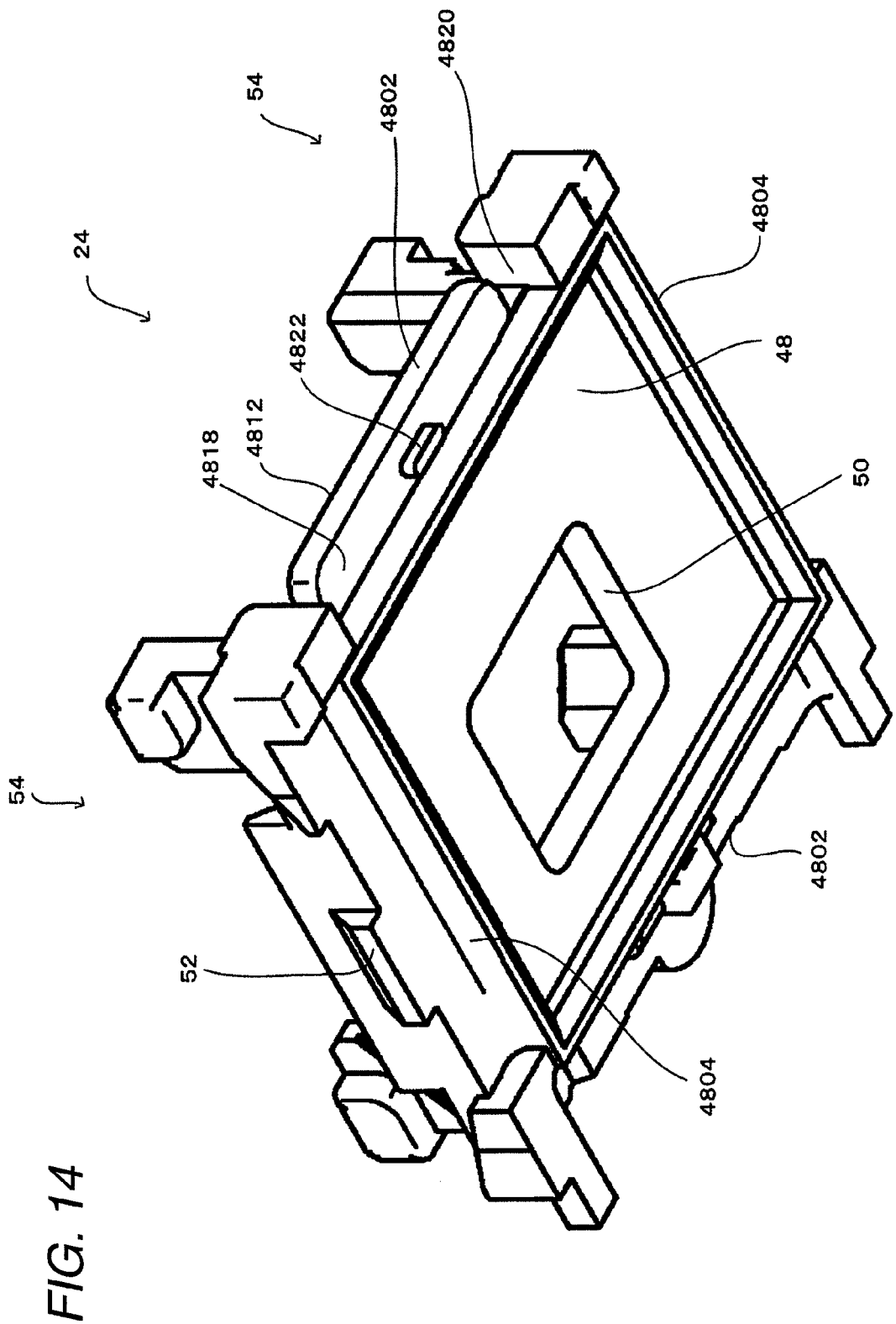
FIG. 14 is a rear perspective view of the rear lens barrel 24.
Figure 15:
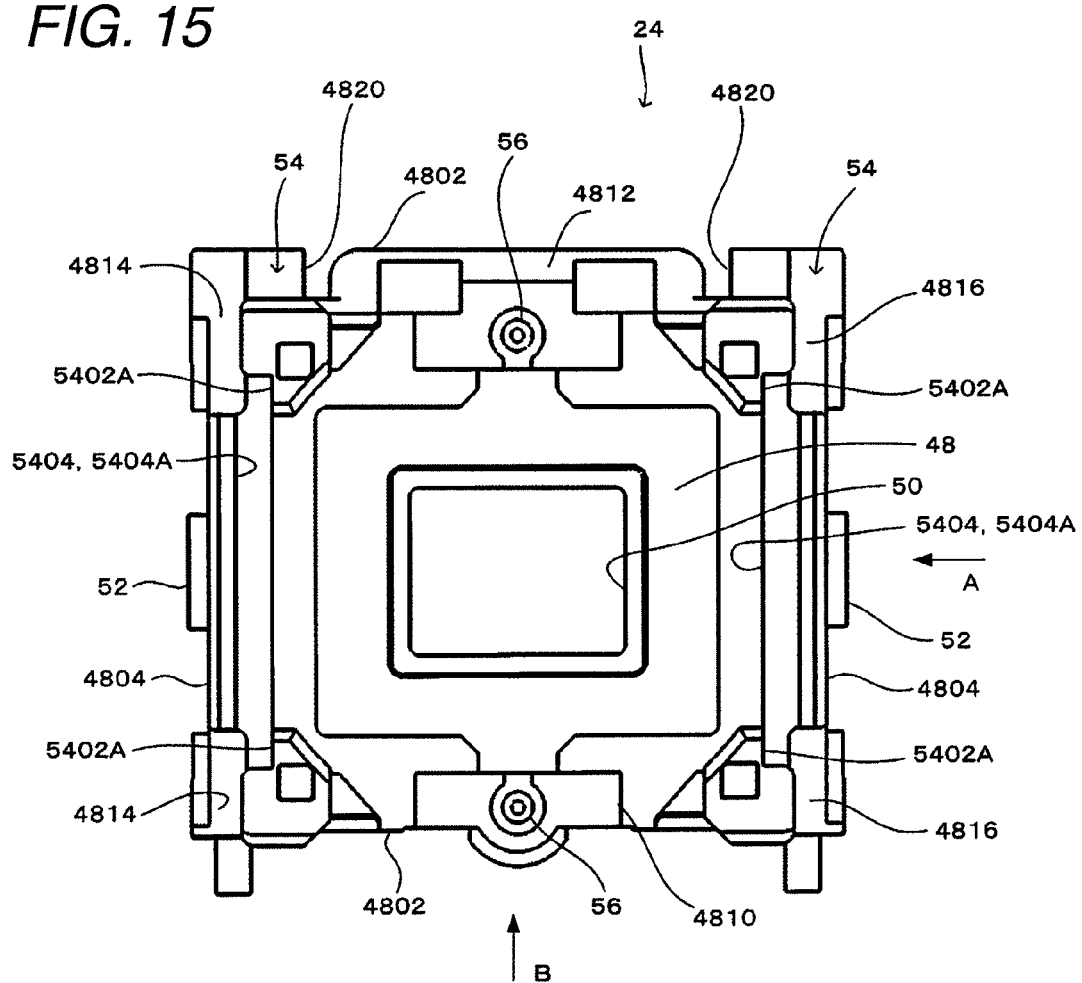
FIG. 15 is a plan view of the rear lens barrel 24.
Figure 16:
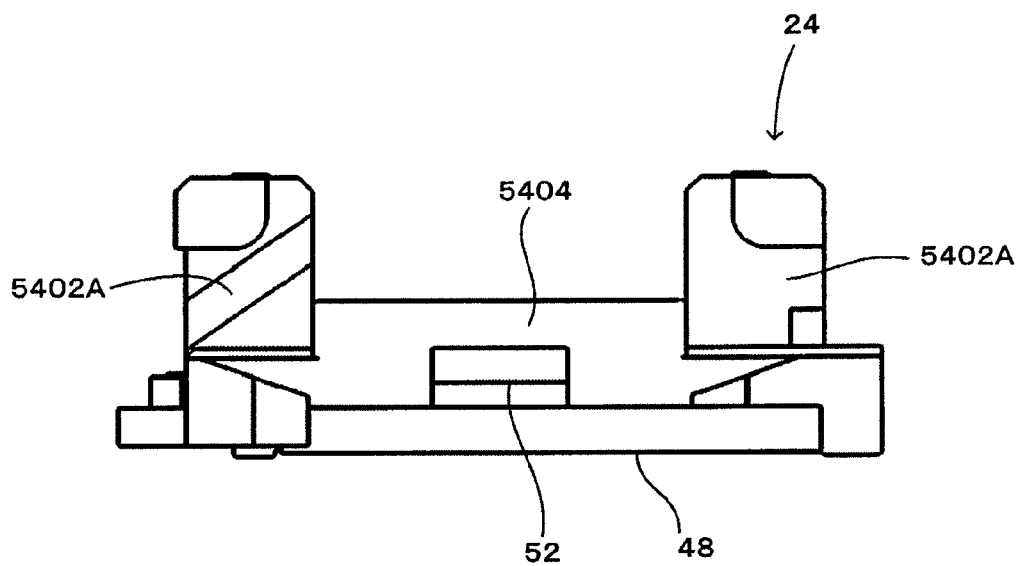
FIG. 16 shows the rear lens barrel 24 viewed in the direction indicated by the arrow A shown in FIG. 15.
Figure 17:
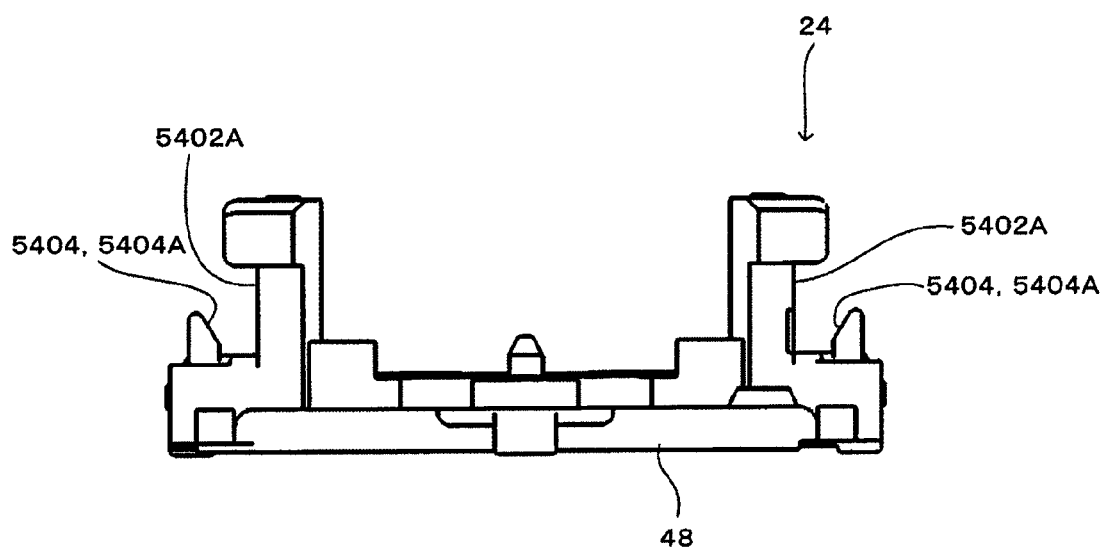
FIG. 17 shows the rear lens barrel 24 viewed in the direction indicated by the arrow B shown in FIG. 15.
Figure 18:
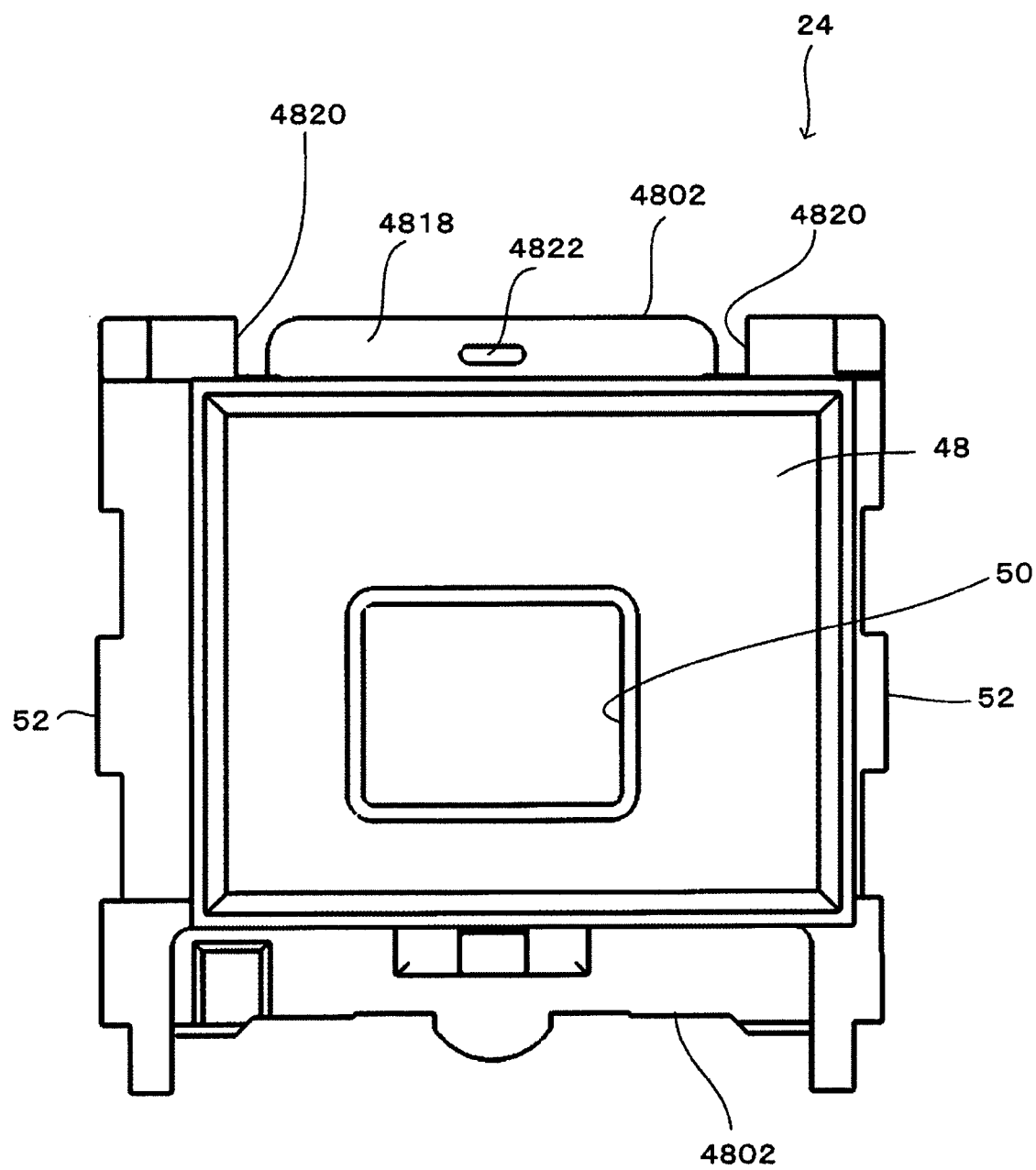
FIG. 18 is a rear view of the rear lens barrel 24.

FIG. 13 is a front perspective view of the rear lens barrel 24. FIG. 14 is a rear perspective view of the rear lens barrel 24. FIG. 15 is a plan view of the rear lens barrel 24. FIG. 16 shows the rear lens barrel 24 viewed in the direction indicated by the arrow A shown in FIG. 15. FIG. 17 shows the rear lens barrel 24 viewed in the direction indicated by the arrow B shown in FIG. 15. FIG. 18 is a rear view of the rear lens barrel 24.

Figure 21:
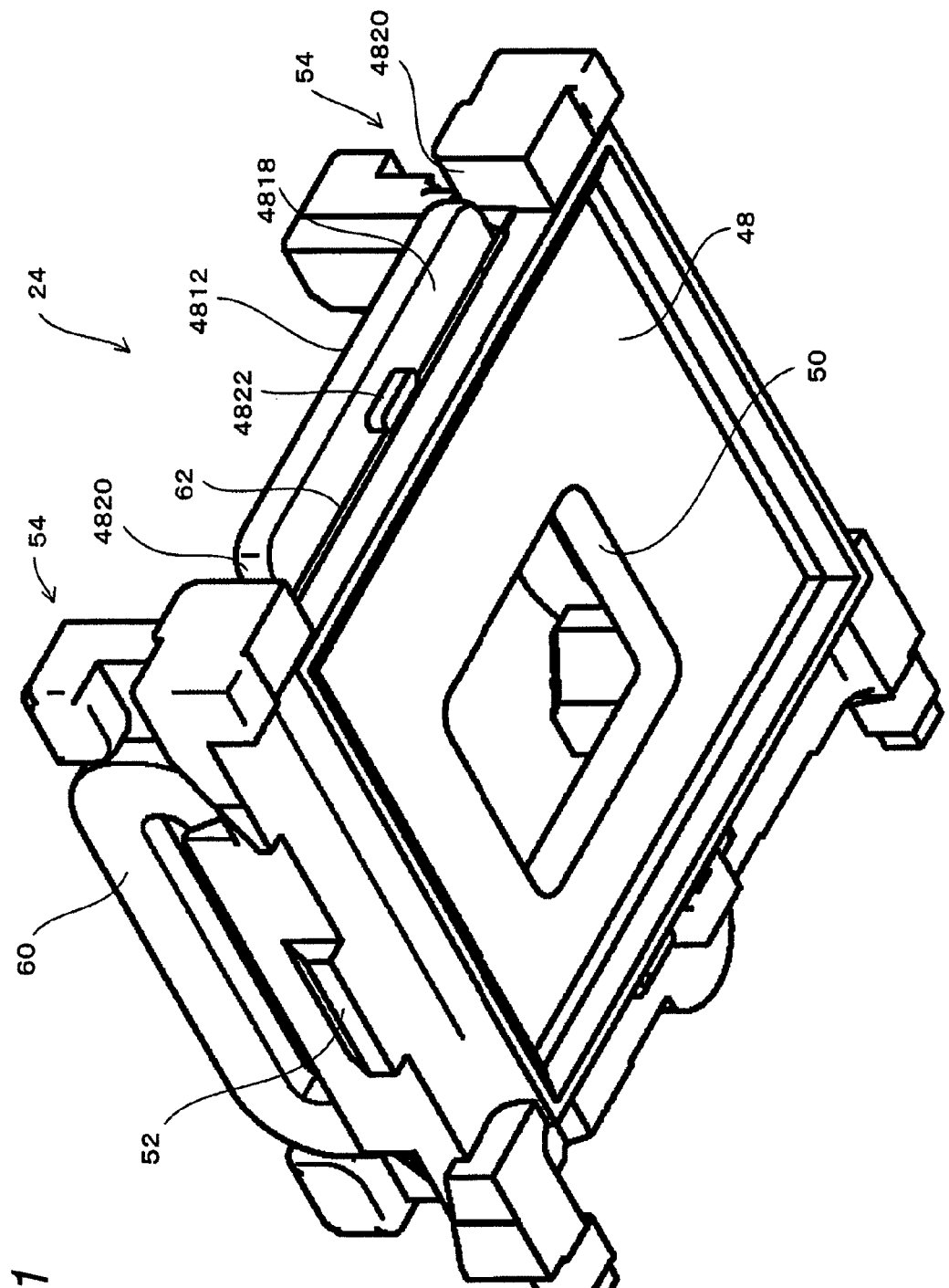
FIG. 21 is a rear perspective view of the rear lens barrel to which the coils are attached.
Figure 22:
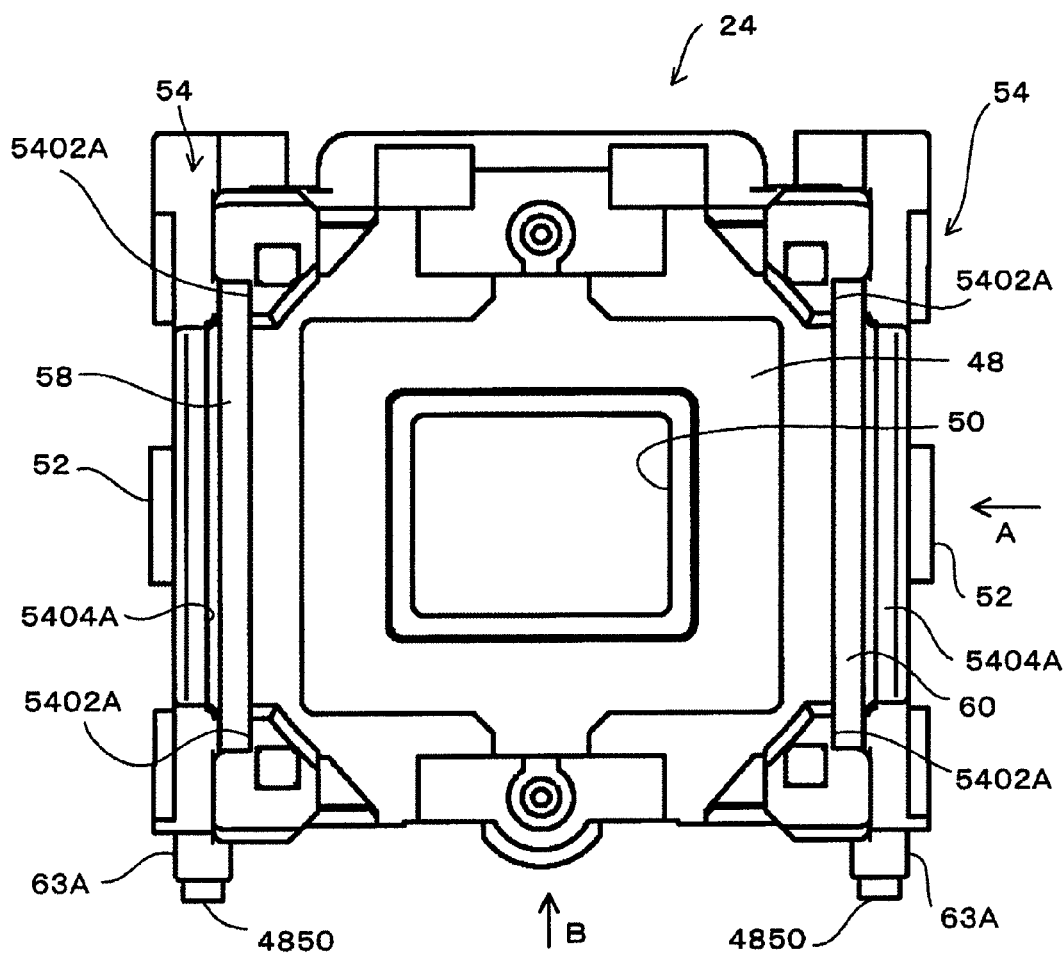
FIG. 22 is a plan view of the rear lens barrel 24 to which the coils are attached.
Figure 23:
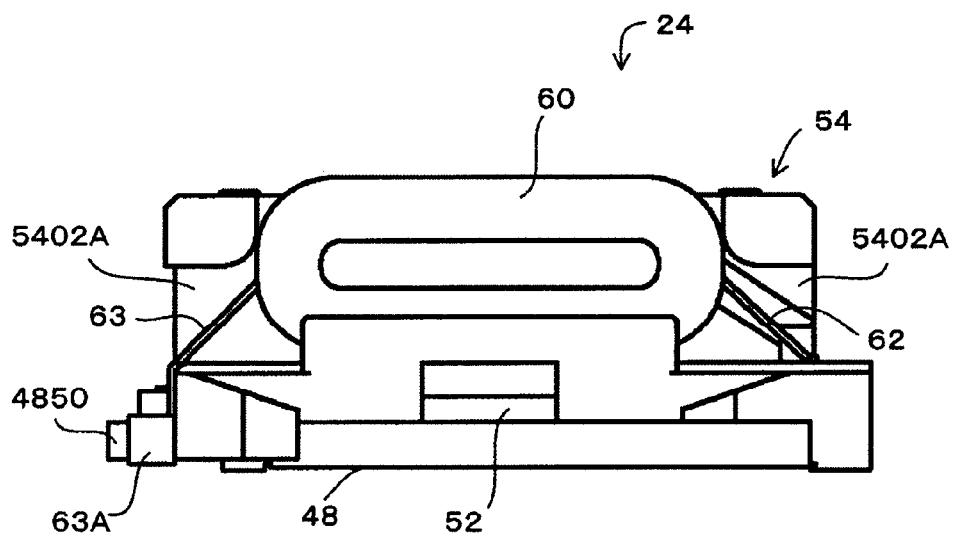
FIG. 23 shows the rear lens barrel 24 to which the coils are attached when viewed in the direction indicated by the arrow A shown in FIG. 22.
Figure 24:
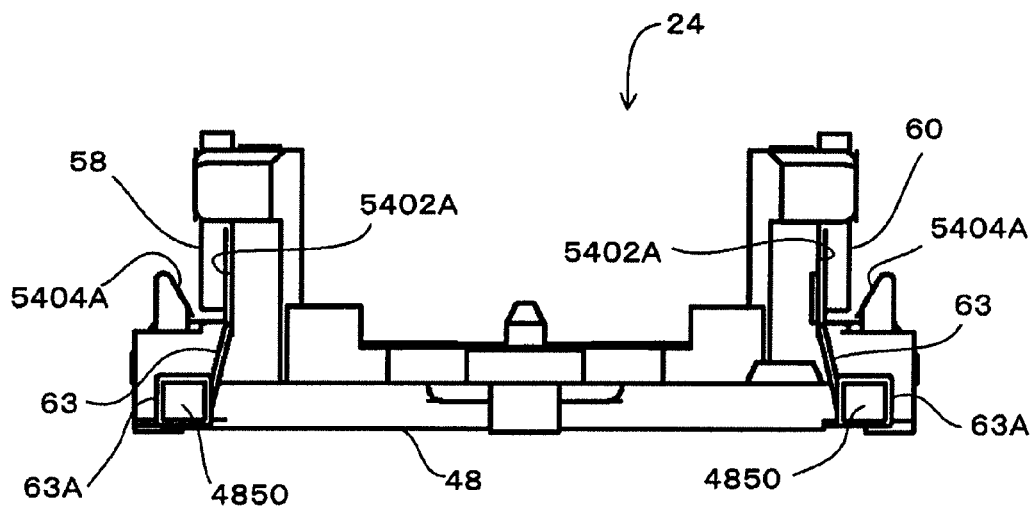
FIG. 24 shows the rear lens barrel 24 to which the coils are attached when viewed in the direction indicated by the arrow B shown in FIG. 22.
Figure 25:
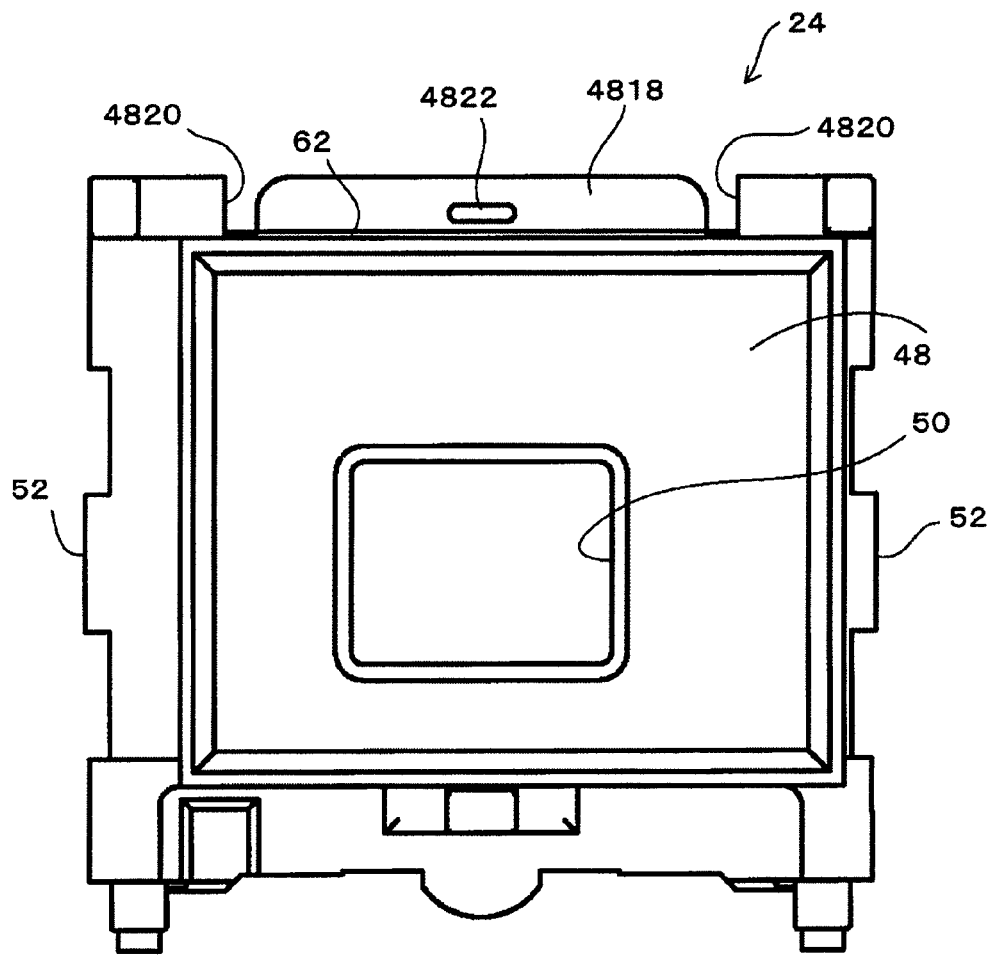
FIG. 25 is a rear view of the rear lens barrel 24 to which the coils are attached.
Figure 26:
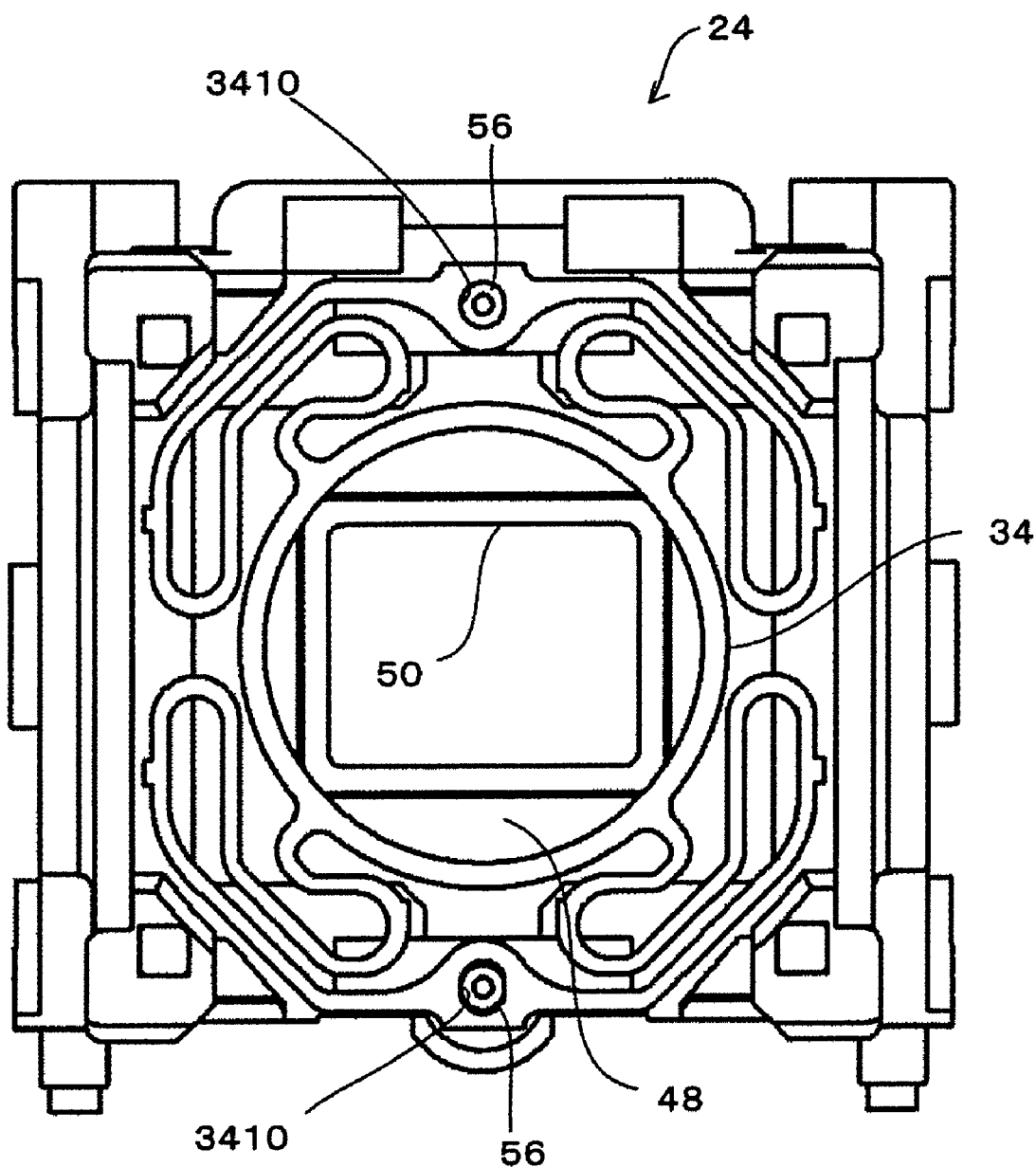
FIG. 26 explains a state in which a rear spring 34 is pressed against a rear portion of the rear lens barrel 24.

FIGS. 19 and 20 are front perspective views of the rear lens barrel 24 to which the coils are attached. FIG. 21 is a rear perspective view of the rear lens barrel 24 to which the coils are attached. FIG. 22 is a plan view of the rear lens barrel 24 to which the coils are attached. FIG. 23 shows the rear lens barrel 24 to which the coils are attached when viewed in the direction indicated by the arrow A shown in FIG. 22. FIG. 24 shows the rear lens barrel 24 to which the coils are attached when viewed in the direction indicated by the arrow B shown in FIG. 22. FIG. 25 is a rear view of the rear lens barrel 24 to which the coils are attached. FIG. 26 explains a state in which the rear spring 34 is pressed against a rear portion of the rear lens barrel 24.

As shown in FIGS. 13 to 18, the rear lens barrel 24 includes a bottom wall 48, an opening 50, engaging protrusions 52, and coil attachment portions 54.

The bottom wall 48 is formed into a rectangular shape that extends in a plane perpendicular to the optical axis and blocks the rear end of the housing space S in the optical axis direction. The front side of the bottom wall 48 thus faces the housing space S.

The bottom wall 48 has a pair of sides 4802 facing each other and a pair of sides 4804 facing each other. Protruding pins 56 for attaching the rear spring 34 are provided at the sides 4802, which form one of the pairs.

The coil attachment portions 54 are provided at the sides 4804, which form the remaining one pair. In other words, the coil attachment portions 54 are provided at two locations on the bottom wall 48 on opposite sides of the optical axis.

The first and second coils 58, 60 are attached to the coil attachment portions 54 in such a way that the surfaces of the coils in the thickness direction are parallel to each other and both ends in the height direction and both ends in the width direction are aligned.

The thus disposed first and second coils 58, 60 not only face each other in the housing space S at locations in the rear lens barrel 24 on opposite sides of the optical axis, but also are parallel to a single imaginary plane including the optical axis, as shown in FIGS. 3 and 35.

Each of the coil attachment portions 54 includes two columns 5402 and a standing wall 5404.

The two columns 5402 spaced apart from each other protrude from the bottom wall 48 and are positioned at both ends of each of the first and second coils 58, 60 in the width direction.

Coil pressing surfaces 5402A extending in the same plane facing outward from the housing space S are provided on the two columns 5402. One surface of each of the first and second coils 58, 60 in the thickness direction is pressed against the corresponding coil pressing surface 5402A.

Each of the standing walls 5404 protrudes from the bottom wall 48 between the two columns 5402 and extends therebetween.

An adhesive filling wall surface 5404A is provided on each of the standing walls 5404 and faces the other surface of the corresponding one of the first and second coils 58, 60 in the thickness direction, the one surface of which is pressed against the corresponding coil pressing surface 5402A.

Each of the adhesive filling wall surfaces 5404A is shaped into an inclined surface that gradually separates from the other surface of the corresponding one of the first and second coils 58, 60 in the thickness direction as the inclined surface separates from the bottom wall 48.

Further, as shown in FIG. 13, raised walls 5410 spaced apart from each other protrude from the coil pressing surfaces 5402A on the two columns 5402, and a guide surface 5412 that engages the inner surface of the front lens barrel 22 is formed on each of the raised walls 5410.

As shown in FIGS. 13 and 15, a first mating surface 4810 is formed on the front side of the bottom wall 48 along one of the pair of sides 4802 of the bottom wall 48.

Further, a second mating surface 4812 is formed on the front side of the bottom wall 48 along the other one of the pair of sides 4802 of the bottom wall 48.

Third mating surfaces 4814 are formed on the front side of the bottom wall 48 at both ends of one of the remaining pair of sides 4804 of the bottom wall 48.

Fourth mating surfaces 4816 are formed on the front side of the bottom wall 48 at both ends of the other one of the remaining pair of sides 4804 of the bottom wall 48.

The first to fourth mating surfaces 4810, 4812, 4814, and 4816 of the rear lens barrel 24 face and mate with the first to fourth mating surfaces 4202, 4204, 4402, and 4404 of the front lens barrel 22 shown in FIG. 7, respectively.

The mating surfaces of the front lens barrel 22 thus mate with those of the rear lens barrel 24 to seal the housing space S and reliably keep dusts from entering.

Further, as shown in FIG. 14, the bottom wall 48 has a rear surface 4818 located on the side opposite the second mating surface 4812, and the relay line 62 (FIG. 20), which will be described later, is disposed on the rear surface 4818.

As shown in FIGS. 19, 20, 21, and 25, cutouts 4820 that cut the bottom wall 48 and allow a winding wire to pass through are provided at locations on the bottom wall 48 inside the second mating surface 4812, the locations facing ends of the first and second coils 58, 60 on the same side in the width direction.

Each of the cutouts 4802 opens outward from the bottom wall 48.

The relay line 62 includes a first winding wire portion that is the portion of the winding wire forming the first coil 58 that is separated therefrom and extracted through the corresponding cutout 4802 onto the rear surface 4818, a second winding wire portion that is the portion of the winding wire forming the second coil 60 that is separated therefrom and extracted through the corresponding cutout 4802 onto the rear surface 4818, and a portion (connecting portion) that linearly extends between the first coil 58 and the second coil 60 along the rear surface 4818 of the bottom wall 48 that is located on the side opposite the housing space S.

A stopper wall 4822 that can abut the relay line 62 is raised from the rear surface 4818 to prevent the relay line 62 from moving away from the optical axis.

(Imaging Device 36)

The imaging device 36 captures a subject image introduced by the imaging optical system 28.

As shown in FIGS. 34 and 35, the imaging device 36 is provided on the front side of a substrate 56 having a rectangular-plate shape.

The imaging device 36 positioned in the opening 50 is sealed by bonding the substrate 56 to the rear surface of the bottom wall 48 and bonding an optical filter 51 that covers the opening 50 to the front surface of the bottom wall 48. The imaging device 36 is therefore provided in the rear lens barrel 24.

(Cover 26)

As shown in FIGS. 2 and 5, the cover 26 includes a front portion 2602 and side portions 2604.

The front portion 2602 has a rectangular-plate shape and covers the front side of the front lens barrel 22.

An opening 2606 is formed in an area of the front portion 2602 that corresponds to the imaging optical system 28.

The side portions 2604 are formed by bending two opposing sides of the front portion 2602, and cover opposite sides of the front lens barrel 22 and the rear lens barrel 24.

Engaging slits 2608 that engage the engaging protrusions 52 on the rear lens barrel 24 are provided in the side portions 2604.

When the engaging slits 2608 in the cover 26 engage the engaging protrusions 52, the front portion 2602 of the cover 26 and the bottom wall 48 of the rear lens barrel 24 sandwich the front lens barrel 22, whereby the front lens barrel 22 is connected to the rear lens barrel 24.

(Lens Holder 30)

Figure 27:
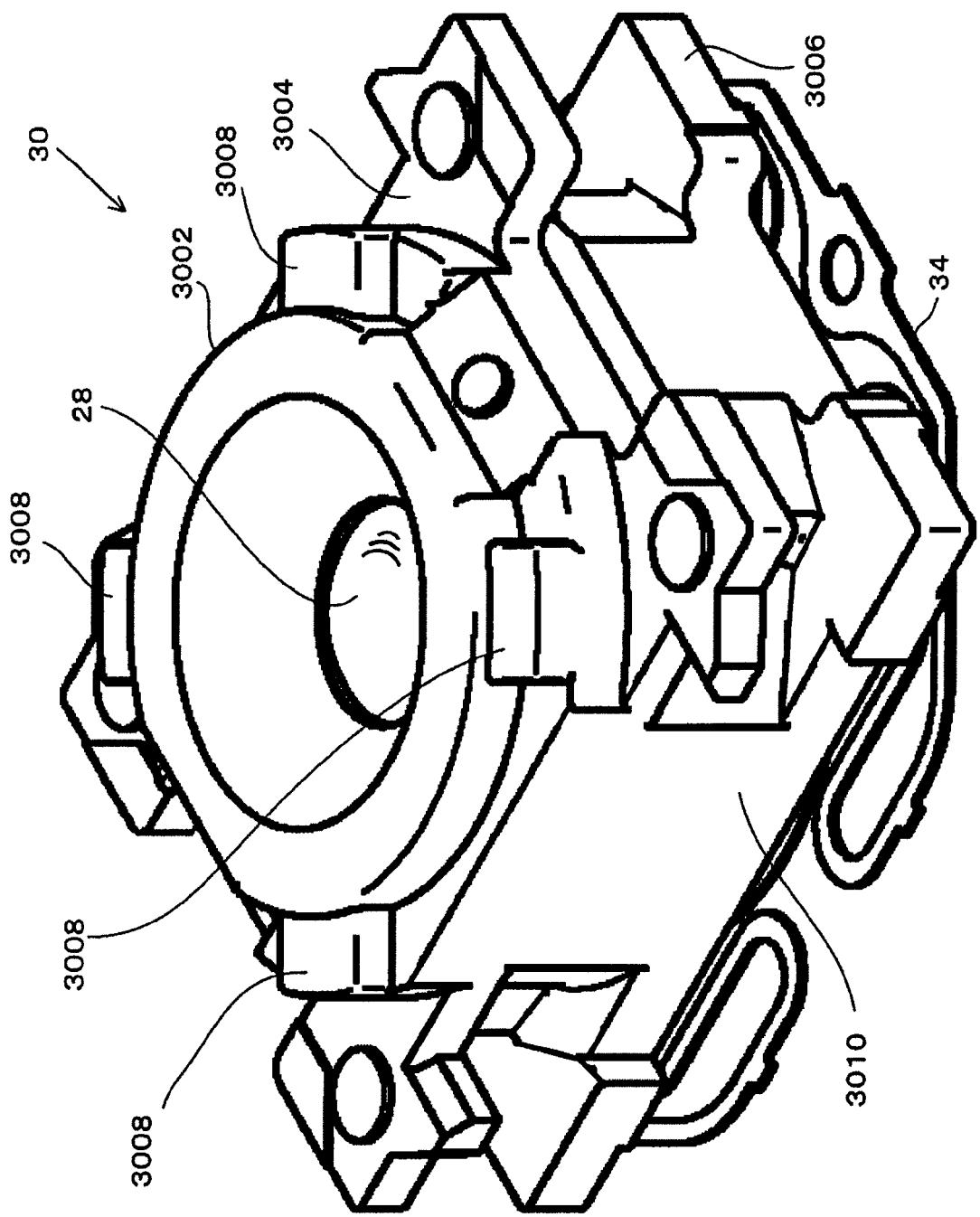
FIG. 27 is a front perspective view of the lens holder 30 against which the rear spring 34 is pressed.
Figure 28:
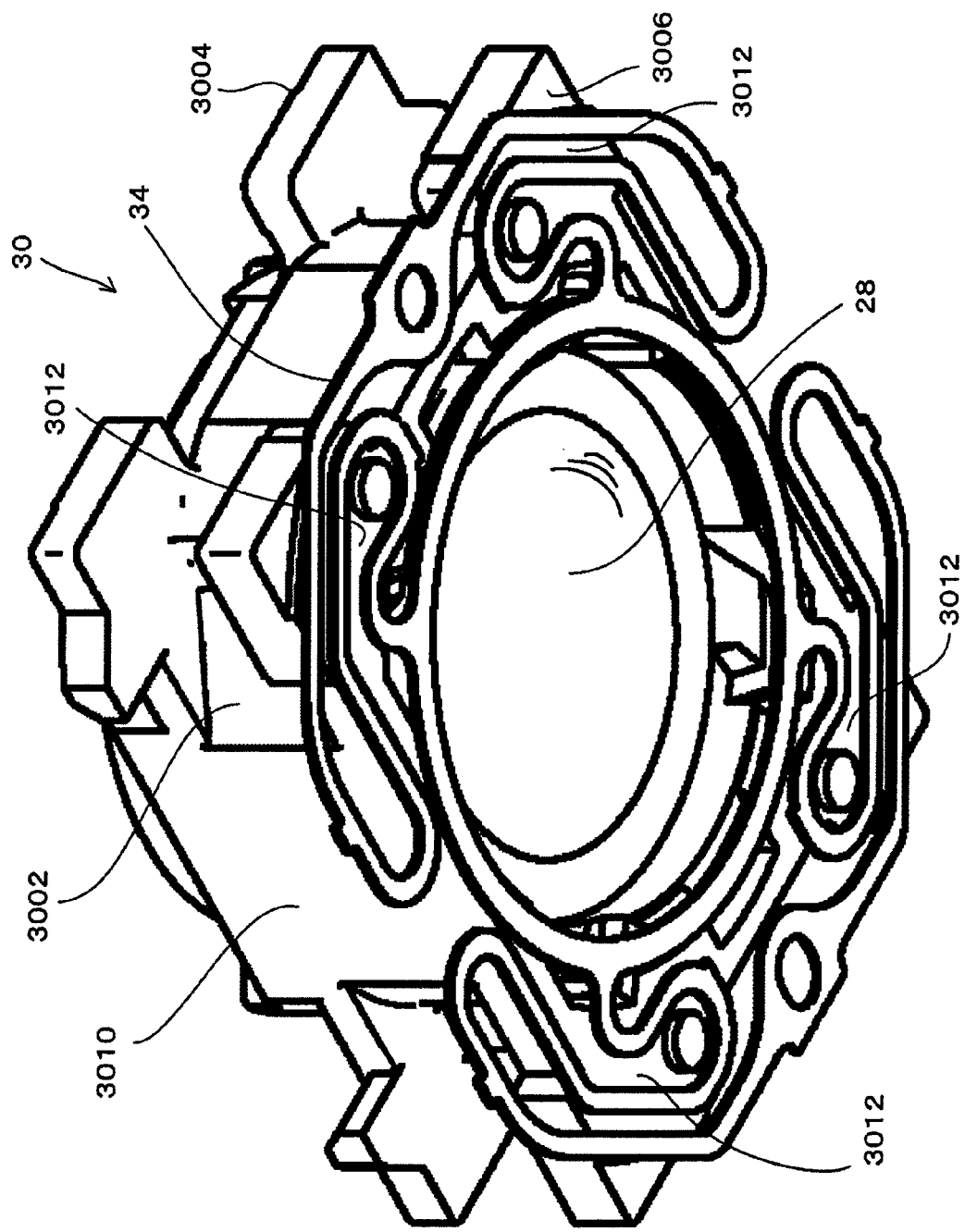
FIG. 28 is a rear perspective view of the lens holder 30 against which the rear spring 34 is pressed.
Figure 29:
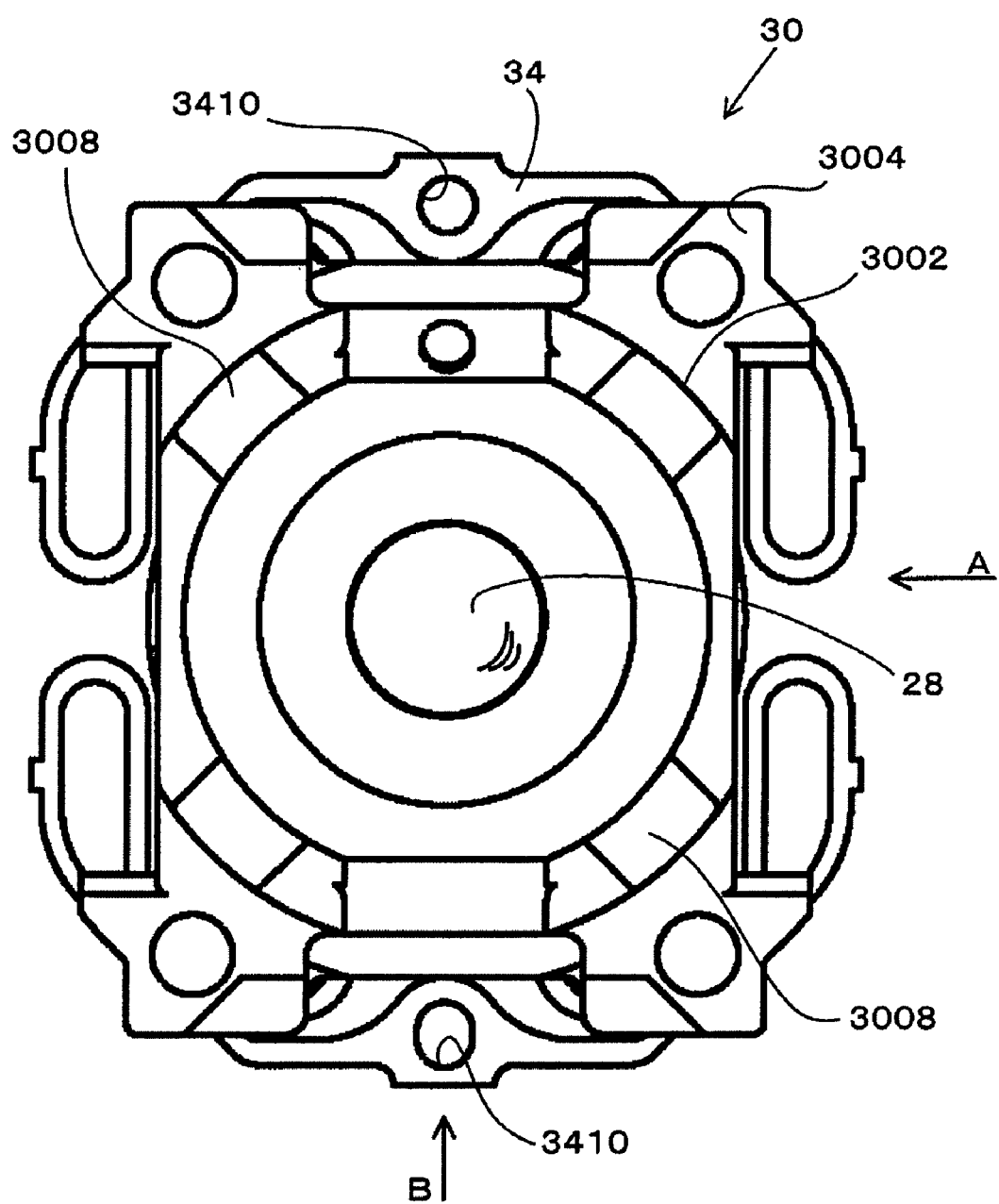
FIG. 29 is a plan view of the lens holder 30 against which the rear spring 34 is pressed.
Figure 30:
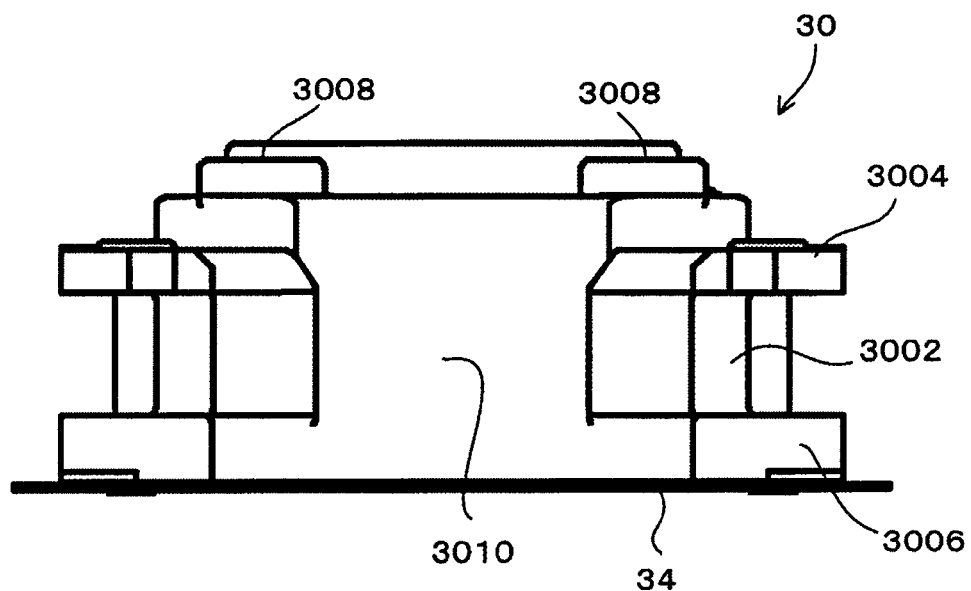
FIG. 30 shows the lens holder 30 against which the rear spring 34 is pressed when viewed in the direction indicated by the arrow A shown in FIG. 29.
Figure 31:
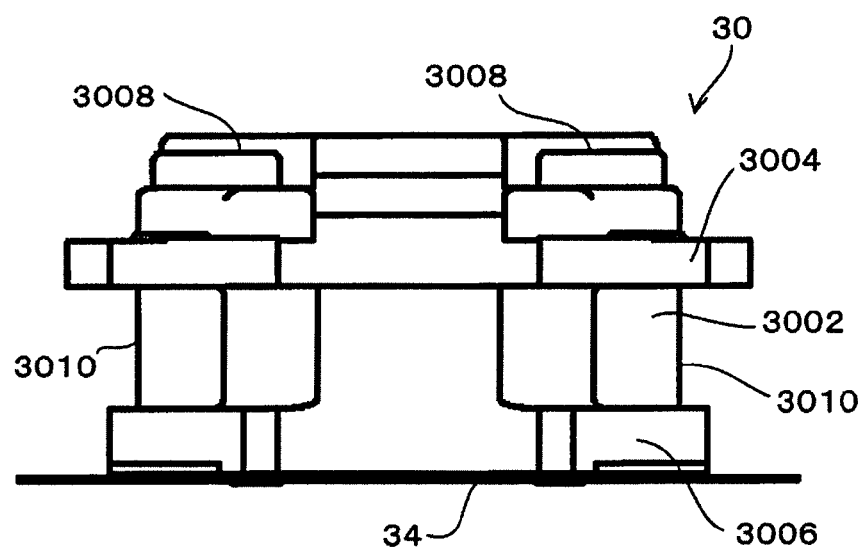
FIG. 31 shows the lens holder 30 against which the rear spring 34 is pressed when viewed in the direction indicated by the arrow B shown in FIG. 29.
Figure 32:
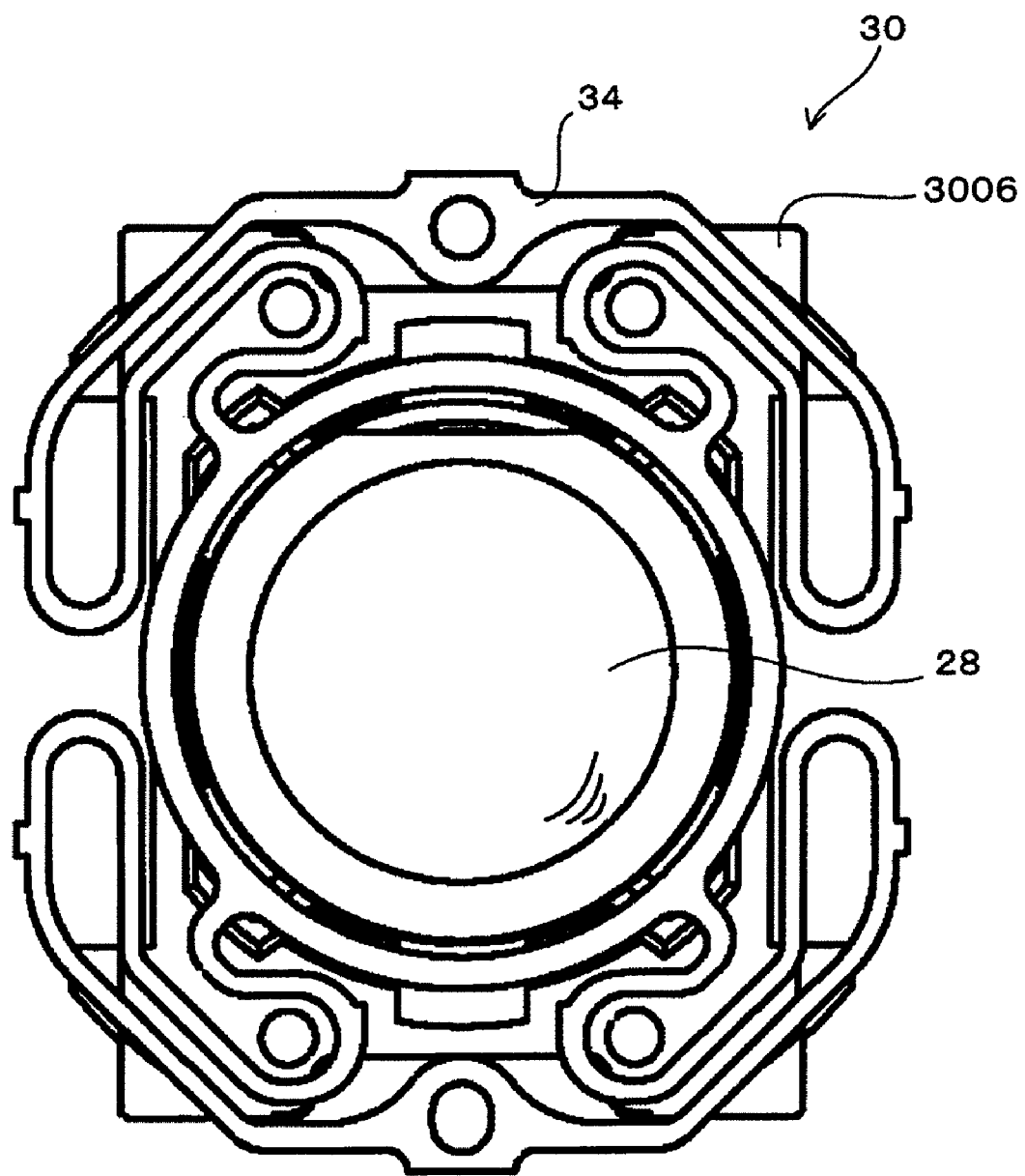
FIG. 32 is a rear view of the lens holder 30 against which the rear spring 34 is pressed.

FIG. 27 is a front perspective view of the lens holder 30 against which the rear spring 34 is pressed. FIG. 28 is a rear perspective view of the lens holder 30 against which the rear spring 34 is pressed. FIG. 29 is a plan view of the lens holder 30 against which the rear spring 34 is pressed. FIG. 30 shows the lens holder 30 against which the rear spring 34 is pressed when viewed in the direction indicated by the arrow A shown in FIG. 29. FIG. 31 shows the lens holder 30 against which the rear spring 34 is pressed when viewed in the direction indicated by the arrow B shown in FIG. 29. FIG. 32 is a rear view of the lens holder 30 against which the rear spring 34 is pressed.

The lens holder 30 holds the imaging optical system 28 and is housed in the housing space S, and the imaging optical system 28 includes a plurality of lens groups, as shown in FIGS. 34 and 35.

As shown in FIGS. 27 to 32, the lens holder 30 has a tubular portion 3002, and the tubular portion 3002 has an inner surface along which the imaging optical system 28 is disposed and an outer surface located on the side opposite the inner surface.

A front flange 3004 and a rear flange 3006 are formed on the outer surface of the tubular portion 3002 on the front and rear sides thereof, respectively.

Further, as shown in FIG. 27, spring abutting surfaces 3008 are formed in front of the front flange 3004 at four locations evenly spaced apart from each other in the circumferential direction at the periphery of the tubular portion 3002. The spring abutting surfaces 3008 extend in a plane perpendicular to the optical axis.

As shown in FIGS. 27 and 28, magnet attachment surfaces 3010 are formed at two opposing locations on the outer surface of the tubular portion 3002, the magnet attachment surfaces 3010 being parallel to a single imaginary plane including the optical axis.

Further, as shown in FIG. 28, four spring abutting surfaces 3012 extending in a single plane perpendicular to the optical axis are formed at the four corners on the rear side of the rear flange 3006.

The lens holder 30 is formed by molding a synthetic resin in a die.

(Front Spring 32, Rear Spring 34)

Figure 33:
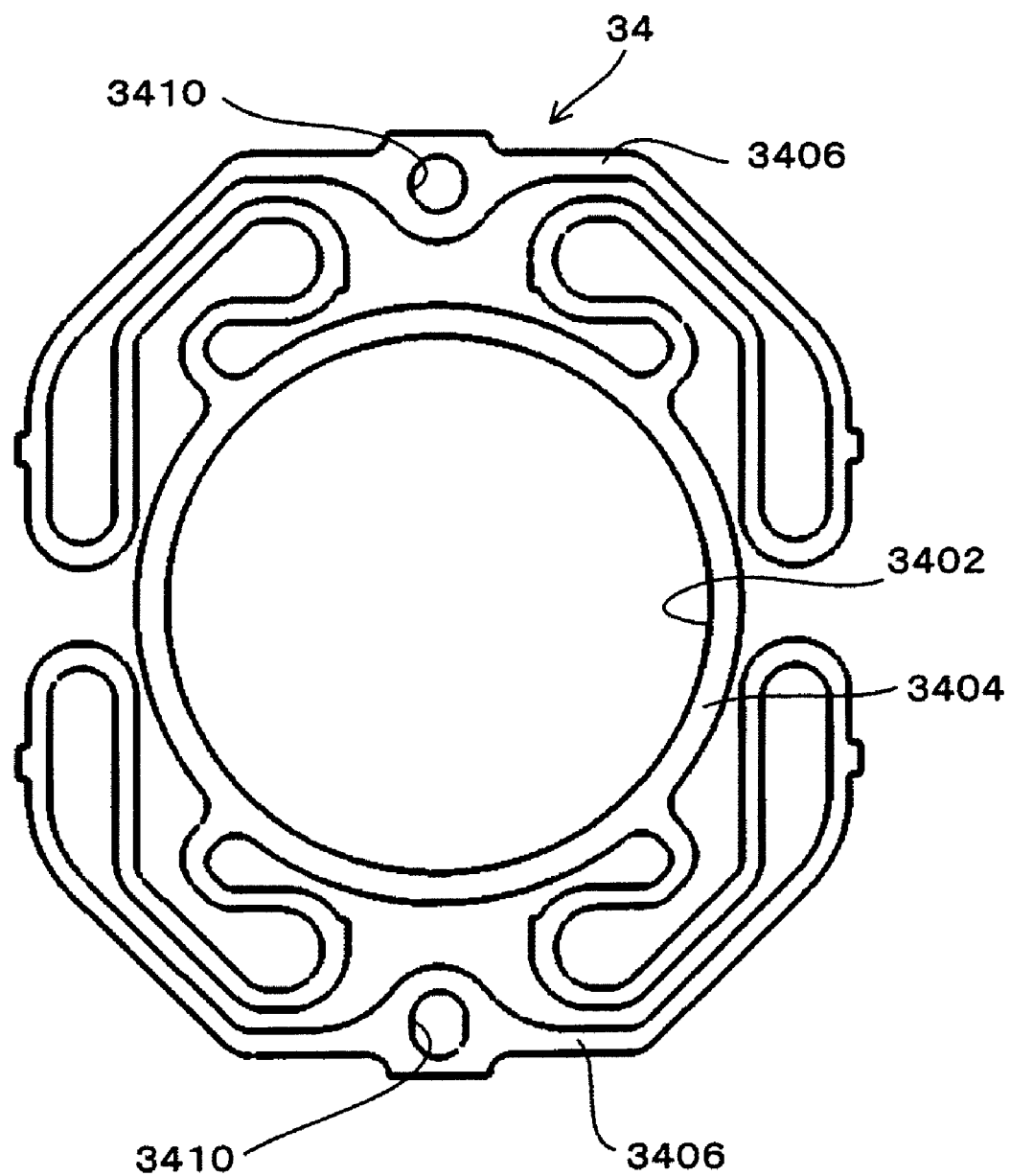
FIG. 33 is a plan view of the rear spring 34.

FIG. 33 is a plan view of the rear spring 34.

The front spring 32 and the rear spring 34 form a guiding mechanism that is disposed in the housing space S and movably supports the lens holder 30 along the optical axis of the imaging optical system 28, as shown in FIGS. 34 and 35.

The front spring 32 is disposed between the front lens barrel 22 and the lens holder 30, and the rear spring 34 is disposed between the rear lens barrel 24 and the lens holder 30.

As shown in FIG. 3, each of the front spring 32 and the rear spring 34 is formed of a thin piece with a narrow width. The front spring 32 and the rear spring 34 have annular shapes that allow openings 3202 and 3402 for the optical path of the imaging optical system 28 to be located at central portions.

More specifically, as shown in FIG. 12, the front spring 32 includes an annular plate 3204 with the opening 3202 formed therein and two supporting pieces 3206 connected to the outer circumference of the annular plate 3204, and can be elastically deformed in the optical axis direction.

The front spring 32 is disposed between the front lens barrel 22 and the lens holder 30 by attaching the outer circumferential portion of each of the supporting pieces 3206 to a front portion 4602 of the corresponding raised wall 46 of the front lens barrel 22, inserting a front portion of the tubular portion 3002 of the lens holder 30 into the opening 3202, and letting the annular plate 3204 abut the four spring abutting surfaces 3008 (FIG. 27) of the lens holder 30.

In the present embodiment, as shown in FIG. 12, the outer circumferential portions of the two supporting pieces 3206 are attached to the front portions 4602 of the raised walls 46 by insert molding in which the outer circumferential portions are embedded in the front portions 4602 during the formation of the front lens barrel 22.

As shown in FIG. 33, the rear spring 34 includes an annular plate 3404 with the opening 3402 formed therein and two supporting pieces 3406 connected to the outer circumference of the annular plate 3404.

The annular plate 3404 of the rear spring 34 is bonded to the spring abutting surfaces 3012 of the lens holder 30, as shown in FIG. 28.

The pins 56 (FIG. 34) on the rear lens barrel 24 are inserted into holes 3410 formed in the two supporting pieces 3406 of the rear spring 34, and the peripheries of the holes 3410 in the supporting pieces 3406 are sandwiched between the front lens barrel 22 and the rear lens barrel 24. The rear spring 34 is thus disposed between the rear lens barrel 24 and the lens holder 30.

Further, in the present embodiment, the fact that the rear spring 34 is supported by the two supporting pieces 3406 is advantageous in providing a certain length of the spring portion extending between each of the two supporting pieces 3406 and the annular plate 3404.

The above configuration is therefore advantageous in ensuring a wide linearity between the amount of deformation of the spring portion and the reaction force, whereby the burden of positional control is reduced when the driving unit 38 moves the lens holder 30 in the optical axis direction. The above configuration is also advantageous in improving characteristics of the positional control on the lens holder 30.

(First and Second Magnets 70, 72)

The driving unit 38 moves the lens holder 30 along the optical axis, and includes first and second magnets 70, 72 in addition to the first and second coils 58, 60, as shown in FIG. 3.

In the present embodiment, as shown in FIGS. 3 and 35, each of the first and second magnets 70, 72 is formed into a rectangular-plate shape having a height extending along the optical axis and a width greater than the height and extending along the direction perpendicular to the height.

The first and second magnets 70, 72 are disposed in the lens holder 30 on opposite sides of the optical axis and parallel to a single imaginary plane including the optical axis.

Specifically, the first and second magnets 70, 72 are disposed on and bonded to the attachment surfaces 3010 of the lens holder 30.

In the present embodiment, each of the first and second magnets 70, 72 is magnetized in such a way that the ends of the magnet along the optical axis become the N and S poles, and the first and second magnets 70, 72 are bonded to the attachment surfaces 3010 via plate-shaped yokes 73 for efficiently guiding the magnetic fluxes to the first and second coils 58, 60, as shown in FIG. 35.

As shown in FIGS. 22 to 24, an end 63 of the winding wire of each of the first and second coils 58, 60 is wound around a shaft 4850 protruding from the bottom wall 48, and the wound portion 63A is soldered and connected to a soldering pad (not shown) on the surface of the substrate 56 (FIG. 5).

Drive signals are supplied from the substrate 56 to the winding wires via the soldering pads, whereby magnetic fields are produced by the first and second coils 58, 60.

Therefore, interaction between the magnetic fields produced by the first and second coils 58, 60 and the magnetic fields produced from the poles of the first and second magnets 70, 72 produces a force in the optical axis direction (thrust force) in the first and second magnets 70, 72. The force moves lens holder 30 and the imaging optical system 28 held by the front spring 32 and the rear spring 34 in the optical axis direction, and the imaging optical system 28 focuses a subject image on the imaging surface of the imaging device 36.

(Assembling)

A description will be made of how to attach the first and second coils 58, 60 and the substrate 56 to the rear lens barrel 24.

The following operations are carried out in advance: Each of the first and second coils 58, 60 is formed by winding a single winding wire. The first coil 58 is connected to the second coil 60 via the relay line 62. The end 63 is extracted from each of the first and second coils 58, 60.

With the first and second coils 58, 60 positioned in the rear lens barrel 24, the length of the relay line 62 is set in advance in such a way that the relay line 62 connecting the first coil 58 to the second coil 60 has a sufficient slack.

First, an adjusting tool is used to grip the first and second coils 58, 60. The relay line 62 is inserted through the cutouts 4820 and extracted onto the rear surface 4818. An intermediate portion of the relay line 62 is positioned inside the stopper wall 4822.

One surface of each of the first and second coils 58, 60 in the thickness direction is then pressed against the corresponding coil pressing surface 5402A and positioned there. The surfaces of the first and second coils 58, 60 in the thickness direction are made parallel to each other, and both ends in the height direction and both ends in the width direction are aligned.

After the positioning is completed, the slack of the relay line 62 is removed as will be described below.

Figure 37:
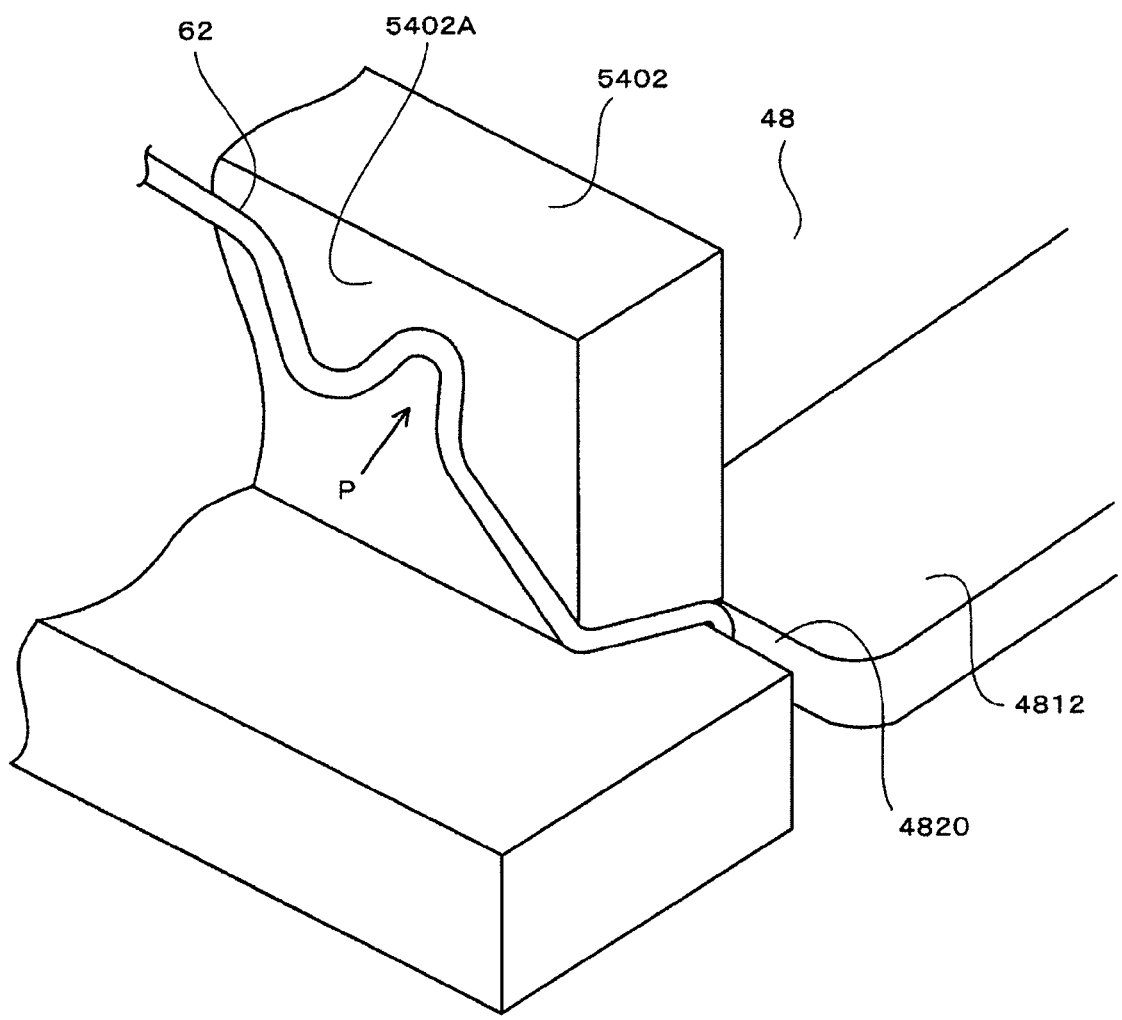
FIG. 37 explains an example of a bent portion for removing a slack of a relay line 62.

That is, the first winding wire portion P that is the portion of the winding wire forming the first coil 58 that is separated therefrom and extracted through the corresponding cutout 4802 onto the rear surface 4818 or the second winding wire portion P that is the portion of the winding wire forming the second coil 60 that is separated therefrom and extracted through the corresponding cutout 4802 onto the rear surface 4818 is lightly twisted into an S shape with tweezers or any other suitable tool along the corresponding coil pressing surface 5402A to form a bent portion for removing the slack, as shown in FIG. 37. The slack of the relay line 62 is thus removed.

Figure 38:
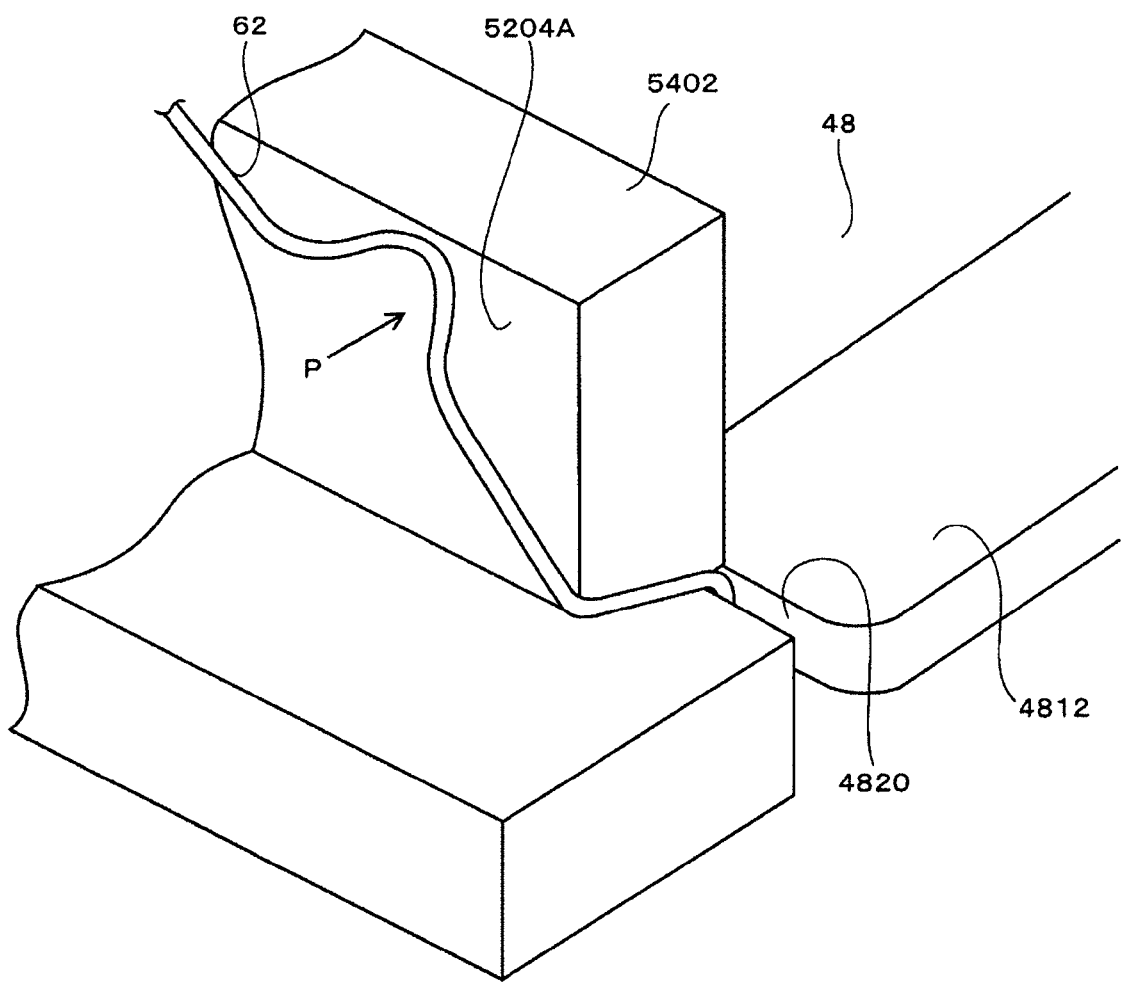
FIG. 38 explains another example of the bent portion for removing a slack of the relay line 62.

Alternatively, as shown in FIG. 38, any of the winding wire portions P is lightly twisted into a U shape with tweezers or any other suitable tool along the corresponding coil pressing surface 5402A to form a bent portion for removing the slack, whereby the slack of the relay line 62 is removed.

Figure 39:
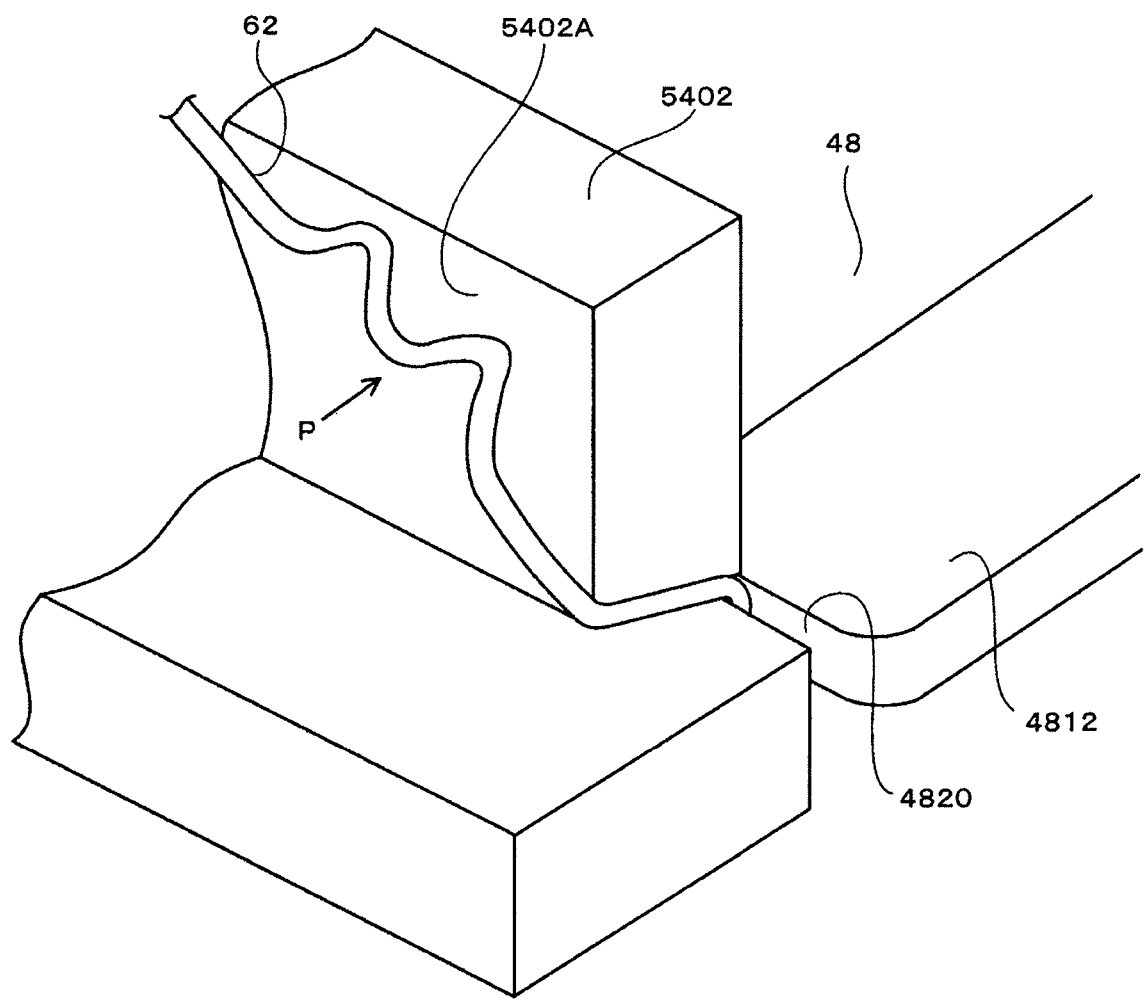
FIG. 39 explains still another example of the bent portion for removing a slack of the relay line 62.

Alternatively, as shown in FIG. 39, any of the winding wire portions P is lightly twisted into an M shape with tweezers or any other suitable tool along the corresponding coil pressing surface 5402A to form a bent portion for removing the slack, whereby the slack of the relay line 62 is removed.

With this state retained, the bent portion, which is the lightly twisted winding wire portion, is bonded and fixed to the coil pressing surface 5402A with an adhesive.

That is, since the first and second coils 58, 60 positioned in the rear lens barrel 24 are placed in such a way that the relay line 62 has a slack, it is possible to readily and reliably carry out the wiring operation of pressing the first and second coils 58, 60 against the respective coil pressing surfaces 5402A, inserting the relay line 62 through the cutouts 4820 and extracting it onto the rear surface 4818, and positioning an intermediate portion of the relay line 62 inside the stopper wall 4822.

Further, since the first and second coils 58, 60 positioned in the rear lens barrel 24 are placed in such a way that the relay line 62 has a slack, the relay line 62 will not accidentally trapped by any portion of the rear lens barrel 24, which is advantageous in improving workability.

Moreover, removing the slack of the relay line 62 with the intermediate portion of the relay line 62 positioned inside the stopper wall 4822 advantageously allows the relay line 62 to be accurately placed in a desired position on the rear surface 4818 in such a way that the relay line 62 linearly extends along the rear surface 4818 with no slack.

Instead of removing the slack of the relay line 62 by slightly twisting the relay line 62 with tweezers or any other suitable tool along any of the coil pressing surfaces 5402A, a slack-removing structure formed in the rear lens barrel 24 may be used to deform any of the winding wire portions P three-dimensionally so as to remove the slack of the relay line 62.

Figure 40:
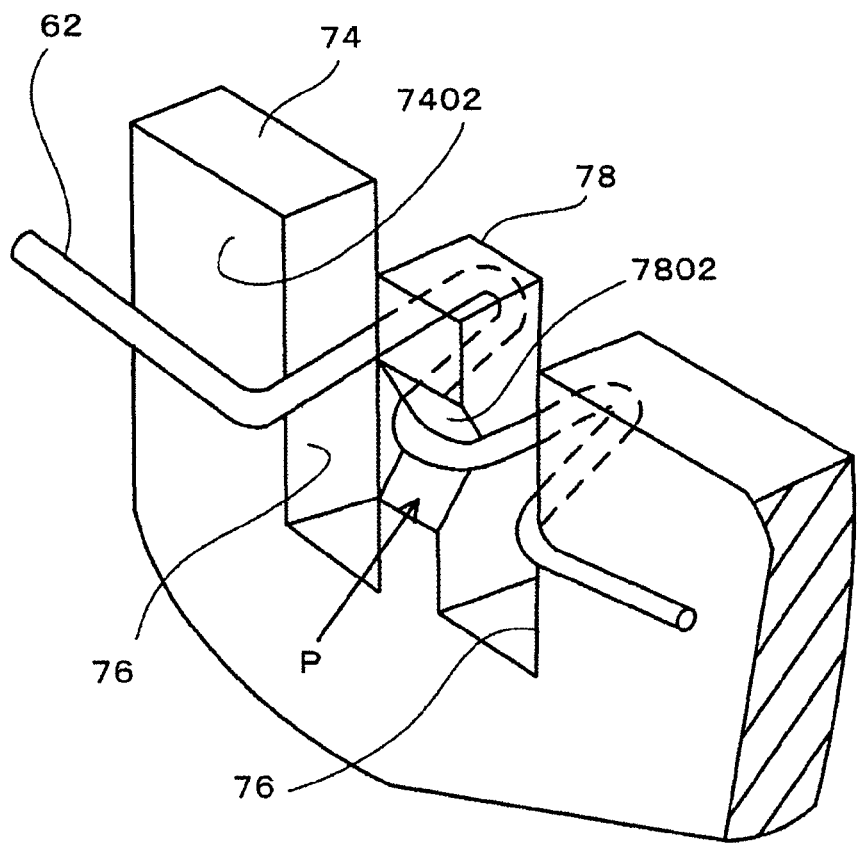
FIG. 40 explains an example of a structure for removing a slack of the relay line 62.

That is, as shown in FIG. 40, a standing wall 74 is provided at a location where the rear lens barrel 24 faces any of the winding wire portions P, the standing wall 74 having a pressing surface 7402 extending along the direction in which the winding wire portion P extends.

Two slots 76 and an intermediate wall 78 positioned between the slots 76 are provided in the standing wall 74, the slots 76 extending in the direction in which they cross the winding wire portion P.

A V-shaped groove 7802 is provided in the intermediate wall 78.

The portions of the winding wire portion P that face the two slots 76 are pushed into the slots 76 with a flat-blade screwdriver or any other suitable tool to form two bent portions for removing the slack. An intermediate portion between the bent portions is pressed against the V-shaped groove 7802.

In this way, the slack of the relay line 62, which connects the first coil 58 to the second coil 60, is removed.

After the slack of the relay line 62 is removed, an appropriate portion of the relay line 62 is bonded and fixed to the pressing surface 7402 with an adhesive.

Figure 41:
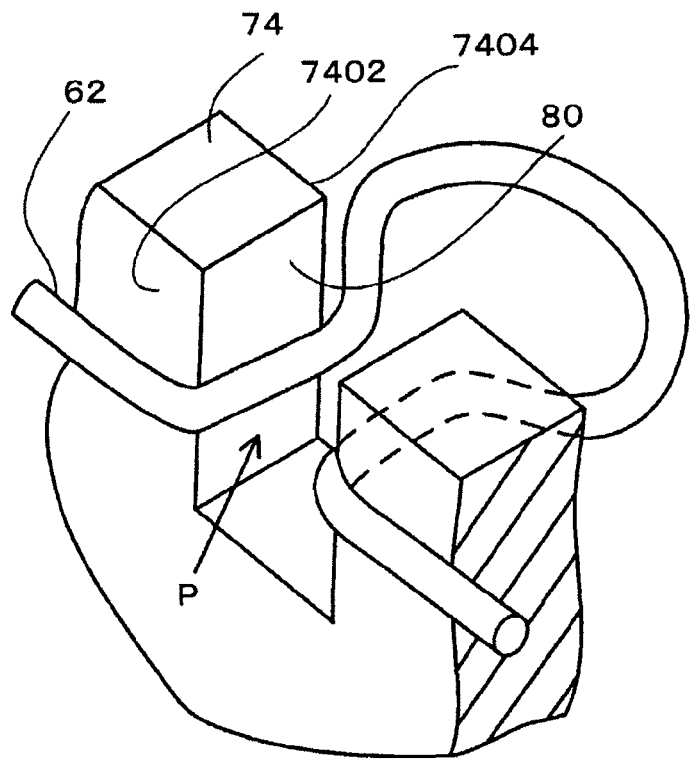
FIG. 41 explains another example of the structure for removing a slack of the relay line 62.

Alternatively, as shown in FIG. 41, a standing wall 74 is provided at a location where the rear lens barrel 24 faces any of the winding wire portions P, the standing wall 74 having a pressing surface 7402 extending along the direction in which the winding wire portion P extends.

A slot 80 extending in the direction in which it crosses the winding wire portion P is provided in the standing wall 74.

The portion of the winding wire portion P that faces the slot 80 is pushed into the slot 80 with a flat-blade screw driver or any other suitable tool to form a bent portion for removing the slack.

After the bent portion is formed, the tool is rotated in the bent portion to expand the contour of the bend portion, whereby the slack of the relay line 62 is removed.

After the slack of the relay line 62 is removed, an appropriate portion of the relay line 62 is bonded and fixed to the pressing surface 7402 with an adhesive.

As described above, using the slack-removing structure to deform the winding wire portion P three-dimensionally allows the slack of the relay line 62 to be reliably removed and the relay line 62 to be disposed in a desired position in an easier operation with a simpler tool, which is advantageous in improving workability.

After the slack of the relay line 62 is removed, an adhesive is filled between the first and second coils 58, 60 and the respective coil pressing surfaces 5402A. The adhesive is then cured to temporarily fix the first and second coils 58, 60.

An adhesive is then filled between the other surface of each of the thus temporarily fixed first and second coils 58, 60 in the thickness direction and the corresponding adhesive filling wall surface 5404A. The adhesive is then cured to bond and fix the first and second coils 58, 60.

The ends 63 of the winding wires of the first and second coils 58, 60 are wound around the shafts 4850 protruding from the bottom wall 48 to form the wound portions 63A.

The rear side of the rear lens barrel 24 is then bonded to the front side of the substrate 56 with an adhesive, and the wound portions 63A are soldered and connected to the soldering pads (not shown) on the substrate 56.

A third unit U3 (FIG. 5) in which the first and second coils 58, 60, the imaging device 36, and the substrate 56 are assembled to the rear lens barrel 24 is thus completed.

A description will be made of how to assemble the camera module 20.

As shown in FIG. 5, a first unit U1 in which the front spring 32 is incorporated into the front lens barrel 22, a second unit U2 in which the imaging optical system 28, the first and second magnets 70, 72, and the rear spring 34 are incorporated into the lens holder 30, and the third unit U3 configured as described above are prepared by separately assembling them.

The second unit U2 is then assembled to the third unit U3. Specifically, as shown in FIG. 26, the pins 56 on the rear lens barrel 24 are inserted into the holes 3410 in the rear spring 34 to mate the second unit U2 with the third unit U3.

The first unit U1 is then assembled to the resultant subassembly. Specifically, the first unit U1 is mated with the third unit U3 by inserting the front portion of the tubular portion 3002 of the lens holder 30 into the opening 3202 in the front spring 32, and letting the annular plate 3204 abut the four spring abutting surfaces 3008 of the lens holder 30.

Finally, the first unit U1 is covered with the cover 26, and the engaging slits 2608 of the cover 26 are engaged with the engaging protrusions 52. Specifically, the first unit U1 is covered with the cover 26 to sandwich the front lens barrel 22 between the upper portion 2602 of the cover 26 and the bottom wall 48 of the rear lens barrel 24.

The first unit U1, the second unit U2, and the third unit U3 are thus combined, and the camera module 20 is completed.

As described above, according to the present embodiment, since the rear surface 4818, which is a dead space on the bottom wall 48 and located on the side opposite the housing space S, is used to dispose the relay line 62 that electrically connects the first coil 58 to the second coil 60, it is not necessary to reserve a space for disposing the relay line 62 on the surface of the bottom wall 48 that faces the housing space S. This is advantageous in reducing the size of the bottom wall 48 and hence the size of the camera module 20.

Further, since the cutouts 4820 that cut the bottom wall 48 and allow a winding wire to pass through are provided at locations on the bottom wall 48 inside the second mating surface 4812, the locations facing ends of the first and second coils 58, 60 on the same side in the width direction, extracting the winding wires of the first and second coils 58, 60 through the cutouts 4820 onto the rear surface 4818 allows the relay line 62 to be readily disposed along the rear surface 4818, which is advantageous in improving workability.

Moreover, since the stopper wall 4822, which can abut the relay line 62 to prevent the relay line 62 from moving away from the optical axis, is formed on the rear surface 4818, the wiring of the relay line 62 can of course be more efficiently carried out. At the same time, using the rear surface 4818, which is a dead space on the bottom wall 48 and positioned on the side opposite the housing space S, to dispose the stopper wall 4822 is advantageous in reducing the size of the bottom wall 48 in size and hence the size of the camera module 20.

Further, since the rear surface 4818, which is positioned on the side opposite the second mating surface 4812 of the bottom wall 48 that is mated with the second mating surface 4204 of the front lens barrel 22, is used to dispose the relay line 62, problems that may occur when the camera module 20 is assembled can be reliably eliminated. For example, the relay line 62 may be broken if the second mating surface 4204 of the front lens barrel 22 comes into contact with the relay line 62 to apply an undesirable force to the relay line 62. The above configuration is therefore advantageous in improving workability.

The adhesive filling wall surface 5404A of each of the coil attachment portions 54 is shaped into an inclined surface that gradually separates from the other surface of the corresponding one of the first and second coils 58, 60 in the thickness direction as the inclined surface separates from the bottom wall 48.

Therefore, there is a space between the upper edge of the adhesive filling wall surface 5404A and the other surface of the corresponding one of the first and second coils 58, 60 in the thickness direction. This is advantageous not only in efficiently filling an adhesive by making use of the space, but also in improving vibration resistance and impact resistance because the bonding strength of the first and second coils 58, 60 with the attachment portions 54 is ensured.

Comparative Example

A comparative example will be described.

Figure 36:
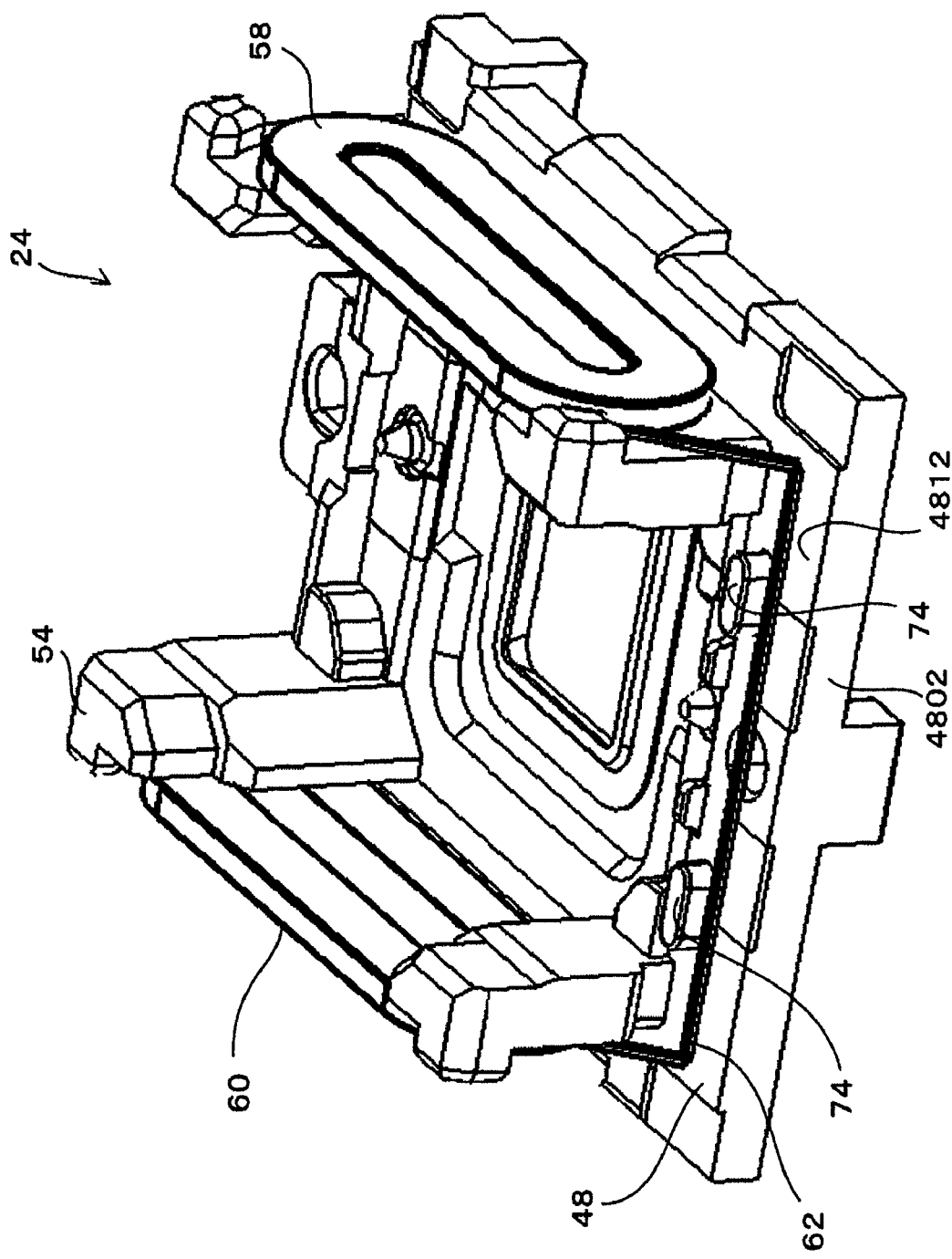
FIG. 36 is a perspective view of the rear lens barrel 24 in a comparative example.

FIG. 36 is a perspective view of the rear lens barrel 24 in the comparative example.

The comparative example has a configuration similar to that of the embodiment described above, but only differs therefrom in terms of the arrangement of the relay line 62 between the first and second coils 58, 60. Therefore, the same portions as those in the embodiment described above have the same reference characters in the drawings and the description thereof will be omitted.

In the comparative example, to eliminate problems, such as breakage of the relay line 62 when sandwiched between the second mating surface 4204 (FIG. 7) of the front lens barrel 22 and the second mating surface 4812 of the rear lens barrel 24, the relay line 62 is disposed and extends along an area of the front side of the bottom wall 48 of the rear lens barrel 24, the area located inside the second mating surface 4812.

Two guide protrusions 74 for guiding and placing the relay line 62 inside the second mating surface 4812 are provided on the front side of the bottom wall 48.

Therefore, in the comparative example, since the relay line 62 is disposed on the front side of the bottom wall 48, it is necessary to reserve a space for disposing the relay line 62 in an area on the front side of the bottom wall 48, the area facing the housing space and located inside the second mating surface 4812, which is disadvantageous in reducing the size of the bottom wall 48.

Further, since the guide protrusions 74 are provided inside the second mating surface 4812 of the bottom wall 48, it is necessary to reserve a larger space inside the second mating surface 4812 on the front side of the bottom wall 48, which is disadvantageous in reducing the size of the bottom wall 48.

Further, since the relay line 62 is disposed inside the second mating surface 4812 of the bottom wall 48 with which the second mating surface 4204 of the front lens barrel 22 mates, there are concerns in the assembling operation of the camera module, such as breakage of the relay line 62 when the second mating surface 4204 of the front lens barrel 22 comes into contact with the relay line 62 and an undesirable force is applied to the relay line 62. This is disadvantageous in improving workability.

As described above, the comparative example is disadvantageous in reducing the size of the camera module and improving the efficiency in workability, while the configuration described above, a significantly simple structure in which the relay line 62 is disposed on the rear surface 4818 of the bottom wall 48, advantageously allows reduction in the size of the camera module and improvement in the efficiency in workability.

Positioning of the rear lens barrel 24, the lens holder 30, and the front lens barrel 22 will be described below.

As described above, the camera module 20 includes the rear lens barrel 24, the front lens barrel 22 that is assembled to the rear lens barrel 24, the front lens barrel 22 and the rear lens barrel 24 together forming the housing space S, the lens holder 30 that holds the imaging optical system 28 and is held in the housing space S, the imaging device 36 that is supported by the rear lens barrel 24 and captures a subject image introduced by the imaging optical system, the guiding mechanism that supports the lens holder 30 movably along the optical axis of the imaging optical system 28, and the driving unit 38 that moves the lens holder 30 along the optical axis of the imaging optical system 28.

The lens holder 30 includes a rear portion positioned on the imaging device side in the optical axis direction and a front portion on the side opposite the rear portion in the optical axis direction.

The guiding mechanism is formed of the rear portion of the lens holder 30, the rear spring 34 made of a thin flat spring provided across the rear lens barrel 24, the front portion of the lens holder 30, and the front spring 32 made of a thin flat spring provided across the front lens barrel 22.

As shown in FIG. 13, the positioning pins 56 oriented parallel to the optical axis and protruding forward are provided at two locations on opposite sides of the optical axis in the rear lens barrel 24.

In the present embodiment, the rear lens barrel 24 has the bottom wall 48 that extends in the direction that crosses the optical axis and faces the housing space S, and the positioning pins 56 are provided at two locations on the bottom wall 48 on opposite sides of an area that faces the housing space S.

As shown in FIG. 26, the two insert holes 3410 into which the two positioning pins 56 are inserted are provided in the rear spring 34.

One of the two insert holes 3410 is formed into a circle to which the corresponding positioning pin 56 conforms, and the other is formed into an ellipse. With one of the positioning pins 56 inserted into the circular insert hole 3410, inserting the other positioning pin 56 into the elliptical insert hole 3410 prevents the rear spring 34 from rotating around the circular insert hole 3410, whereby the rear spring 34 is positioned in place.

As shown in FIGS. 7 and 34, engaging portions 80 that engage the two positioning pins 56 are provided in the front lens barrel 22.

Each of the engaging portions 80 is open toward the other engaging portion 80.

Inserting the two positioning pins 56 into the insert holes 3410 in the rear spring 34 allows positioning of the rear lens barrel 24 and the lens holder 30 in a plane perpendicular to the optical axis.

Engaging the two positioning pins 56 with the engaging portions 80 of the front lens barrel 22 allows positioning of the front lens barrel 22 and the rear lens barrel 24 in a plane perpendicular to the optical axis.

In the present embodiment, the lens holder 30 has the tubular portion 3002 that holds the imaging optical system 28, as shown in FIG. 27.

The spring abutting surfaces 3008 facing forward are provided along the periphery of the tubular portion 3002.

As shown in FIG. 12, the front spring 32 has the annular plate 3204 that can abut the spring abutting surfaces 3008.

The front spring 32 is disposed by attaching two portions on opposite sides of an area of the front spring 32 that faces the housing space S to the front lens barrel 22 and letting the annular plate 3204 of the front spring 32 abut the spring abutting surfaces 3008.

As shown in FIG. 28, the spring abutting surfaces 3012 facing rearward are formed on the rear side of the lens holder 30 on outer areas of the tubular portion 3002 in the radial direction.

As shown in FIG. 33, the rear spring 34 has the annular plate 3404 that can abut the spring abutting surfaces 3012.

The annular plate 3404 of the rear spring 34 is attached to the spring abutting surfaces 3012.

The rear spring 34 is disposed by sandwiching two portions on opposite sides of an area of the rear spring 34 that faces the housing space S between the front lens barrel 22 and the rear lens barrel 24.

According to the above configuration, the two positioning pins 56 position the three members: the rear lens barrel 24, the lens holder 30, and the front lens barrel 22, which is advantageous in improvement in positioning accuracy and reduction in size.

In the present embodiment, while the description has been made of a case where the electronic apparatus 10 in which the camera module 20 is built is a mobile phone, the imaging apparatus of the embodiment of the invention is widely applicable to PDAs, notebook personal computers, and other portable information terminals, and digital still cameras, video camcorders, and a variety of other electronic apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A camera module comprising:
    a rear lens barrel;
    a front lens barrel assembled to the rear lens barrel, the front lens barrel and the rear lens barrel together forming a housing space;
    a lens holder that holds an imaging optical system and is housed in the housing space;
    a guiding mechanism that movably supports the lens holder along an optical axis of the imaging optical system; and
    a driving unit that moves the lens holder along the optical axis of the imaging optical system, the driving unit including
    a magnet provided in the lens holder, and
    a coil that faces the magnet,
    wherein the rear lens barrel has a bottom wall that faces the housing space,
    the coil includes first and second coils disposed in the rear lens barrel on opposite sides of the optical axis in the housing space,
    a winding wire that forms the first coil is electrically connected in series to a winding wire that forms the second coil via a relay line, and the relay line has a portion extending between the first coil and the second coil along a surface of the bottom wall that is located on the side opposite the housing space.

2. The camera module according to claim 1, wherein the front lens barrel has a tubular shape, the bottom wall has a mating surface and a rear surface located on the side opposite the mating surface, the mating surface extending in a plane that crosses the optical axis and mating with the rear end of the front lens barrel, each of the first and second coils has a flat-plate shape having a thin thickness in the direction of a central axis around which the winding wire forming the coil is wound, a height perpendicular to the width and extending along the optical axis, and a width perpendicular to the height, the first and second coils are disposed in such a way that the surfaces thereof in the thickness direction are parallel to each other, cutouts that cut the bottom wall and allow the winding wires to pass through are provided at locations on the bottom wall inside the mating surface, the locations facing ends of the first and second coils on the same side in the width direction, and the relay line includes a first winding wire portion that is the portion of the winding wire forming the first coil that is separated therefrom and extracted through the corresponding cutout onto the rear surface, a second winding wire portion that is the portion of the winding wire forming the second coil that is separated therefrom and extracted through the corresponding cutout onto the rear surface, and a connecting portion that connects the first winding wire portion to the second winding wire portion on the rear surface.

3. The camera module according to claim 2, wherein a stopper wall that can abut the relay line is raised from the rear surface to prevent the relay line from moving away from the optical axis.

4. The camera module according to claim 1, wherein each of the first and second coils has a flat-plate shape having a thin thickness in the direction of a central axis around which the winding wire forming the coil is wound, a height perpendicular to the width and extending along the optical axis, and a width perpendicular to the height, coil attachment portions are provided at locations on the bottom wall that face each other, the first and second coils are attached to the coil attachment portions in such a way that the surfaces of the first and second coils in the thickness direction are parallel to each other, each of the coil attachment portions includes two columns spaced apart from each other, protruding from the bottom wall, and positioned at both ends of the corresponding one of the first and second coils in the width direction, coil pressing surfaces formed on the two columns, the coil pressing surfaces extending in the same plane facing outward from the housing space, one surface of each of the first and second coils in the thickness direction being pressed against the corresponding coil pressing surface, a standing wall protruding from the bottom wall between the two columns and extending therebetween, and an adhesive filling wall surface that is provided on the standing wall and faces the other surface of the corresponding one of the first and second coils in the thickness direction, the one surface of which is pressed against the corresponding coil pressing surface.

5. The camera module according to claim 4, wherein each of the first and second coils is attached to the corresponding coil pressing surface with an adhesive in such a way that one surface of the coil in the thickness direction is pressed against the coil pressing surface at both ends of the one surface in the width direction, and each of the first and second coils is attached to the corresponding adhesive filling wall surface with an adhesive filled between the other surface of the coil in the thickness direction and the adhesive filling wall surface.

6. The camera module according to claim 4, wherein each of the adhesive filling wall surfaces is shaped into an inclined surface that gradually separates from the other surface of the corresponding one of the first and second coils in the thickness direction as the inclined surface separates from the bottom wall.

7. The camera module according to claim 1, wherein a bent portion for removing a slack of the relay line is provided at part of the relay line.

8. The camera module according to claim 7, wherein the bent portion is fixed to the rear lens barrel with an adhesive.

* * * * *